United States Patent
Steyer et al.

(10) Patent No.: US 12,208,803 B2
(45) Date of Patent: Jan. 28, 2025

(54) METHOD AND PROCESSING UNIT FOR DETERMINING THE SIZE OF AN OBJECT

(71) Applicant: Bayerische Motoren Werke Aktiengesellschaft, Munich (DE)

(72) Inventors: Sascha Steyer, Munich (DE); Dominik Kellner, Dachau (DE); Georg Tanzmeister, Munich (DE)

(73) Assignee: Bayerische Motorenwerke Aktiengesellschaft, Munich (DE)

( * ) Notice: Subject to any disclaimer, the term of this patent is extended or adjusted under 35 U.S.C. 154(b) by 431 days.

(21) Appl. No.: 17/594,223

(22) PCT Filed: Mar. 14, 2020

(86) PCT No.: PCT/DE2020/100192
§ 371 (c)(1),
(2) Date: Oct. 7, 2021

(87) PCT Pub. No.: WO2020/207528
PCT Pub. Date: Oct. 15, 2020

(65) Prior Publication Data
US 2022/0153276 A1    May 19, 2022

(30) Foreign Application Priority Data
Apr. 9, 2019 (DE) .......................... 102019109333.3

(51) Int. Cl.
*B60W 40/04* (2006.01)
*B60W 60/00* (2020.01)
(Continued)

(52) U.S. Cl.
CPC ........ *B60W 40/04* (2013.01); *B60W 60/0015* (2020.02); *B60W 2420/408* (2024.01); *G01S 7/41* (2013.01); *G01S 7/4802* (2013.01)

(58) Field of Classification Search
CPC ............. B60W 40/04; B60W 60/0015; B60W 2420/408; G01S 7/41; G01S 7/4802;
(Continued)

(56) References Cited

U.S. PATENT DOCUMENTS

| | | |
|---|---|---|
| 2007/0154068 A1 | 7/2007 | Stein et al. |
| 2022/0083074 A1* | 3/2022 | Ferrer ................... B25J 9/1697 |
| 2024/0013538 A1* | 1/2024 | Sarkar ................. G06F 16/3329 |

FOREIGN PATENT DOCUMENTS

| | | |
|---|---|---|
| DE | 102013203239 A1 | 8/2014 |
| DE | 102013220170 A1 | 4/2015 |

(Continued)

*Primary Examiner* — Yonel Beaulieu
(74) *Attorney, Agent, or Firm* — Kieran O'Leary; 2SPL Patent Attorneys PartG mbB

(57) ABSTRACT

A method (700) for determining the value of a size of an object (150) is described. The method (710) comprises determining (711) an occupancy grid (200) indicating evidence that individual cells (201) are vacant or occupied by the object (150). Further, the method (710) comprises determining (712) a subset of cells (201) associated with the object (150). Further, the method (710) comprises detecting (713) two opposing bounding edges of the object (150), and determining (714) a measurement value of the size of the object (150) based on the distance between the detected edges of the object (150). The method (710) further comprises determining (715) a quality measure indicating how well the two opposing edges of the object (150) could be detected, and determining (716) a measurement probability distribution of the size of the object (150) dependent on the quality measure. Further, the method (710) comprises determining (717) a cumulative probability distribution based on the measurement probability distribution, and determining (718) a value of the size of the object (150) based on the cumulative probability distribution.

17 Claims, 6 Drawing Sheets

(51) Int. Cl.
*G01S 7/41* (2006.01)
*G01S 7/48* (2006.01)

(58) Field of Classification Search
CPC . G06T 2207/30261; G06T 7/62; G06T 7/277; G06V 20/58
See application file for complete search history.

(56) References Cited

FOREIGN PATENT DOCUMENTS

DE 102017206436 A1 10/2018
WO WO-2022060522 A1 * 3/2022 ............ B25J 9/1697

* cited by examiner

METHOD AND PROCESSING UNIT FOR DETERMINING THE SIZE OF AN OBJECT

CROSS-REFERENCE TO RELATED APPLICATIONS

This application is a 35 U.S.C. § 371 (c) national stage entry of PCT/DE2020/100192, filed on Mar. 14, 2020. That application claimed priority to German Application 10 2019 109 333.3 filed on Apr. 9, 2019. The contents of the earlier filed applications are incorporated by reference herein in their entirety.

FIELD

The invention relates to a method and a corresponding processing unit which, for example, enable a vehicle to detect an object in the vicinity of the vehicle on the basis of sensor data and/or determine information with respect to the detected object.

BACKGROUND

A vehicle typically comprises a plurality of different environment sensors that are configured to collect sensor data related to an environment of the vehicle. Exemplary environment sensors are radar sensors, ultrasonic sensors, LIDAR sensors, image sensors, etc. Based on the sensor data from one or more environment sensors of a vehicle, one or more objects (e.g. one or more other vehicles) may be detected in an environment of the vehicle.

The present document deals with the technical task of providing a method and a corresponding processing unit by means of which an object may be detected in a precise and robust manner, especially an object in the environment of a vehicle and/or information with respect to the detected object may be determined. Particular focus is placed on determining the dimensions and/or condition of an object in a precise manner and tracking or tracing it over time.

SUMMARY

This object is solved by any of the independent claims. Advantageous embodiments are described in the dependent claims, among other things. It should be noted that additional features of a claim—dependent on an independent claim—without the features of the independent claim or only in combination with a subset of the features of the independent claim, may form a separate invention, which is independent on the combination of any features of the independent claim, which may be the subject matter of an independent claim, a divisional application or a subsequent application. This applies in the same way to technical teachings described in the description which may constitute an invention independent of the features of the independent claims.

A method for determining an object state of an object at a sequence of time points is described. In particular, the object state is to be updated at successive points in time to provide the current object state at each point in time in a precise and robust manner. The object may be in an environment of a vehicle. The method may be carried out by an evaluation unit of the vehicle. The determined object state may be used to provide a vehicle function in the vehicle (e.g., to at least partially automate driving of the vehicle).

The object state may include values for one or more state variables. In particular, the one or more state variables may include the position of the object in a spatial area (in the environment of the vehicle), the orientation of the object, and/or the velocity of the object. The spatial area may be divided into a plurality of cells. The object may belong to a specific object class and/or to a specific object type. Exemplary object classes are: a car (passenger car), a truck (lorry), a pedestrian, a cyclist, a motorcyclist and/or another road user.

The method may be repeated in an iterative manner for the sequence of successive time instants. In this regard, the method steps described in this document may be performed repeatedly for successive points in time t−1, t, t+1, etc. The steps performed at and/or for a time instant t are described below.

The method comprises determining an occupancy grid based on sensor data from one or more (environmental) sensors with respect to the spatial area. The occupancy grid may indicate, for each of the plurality of cells, an evidence and/or evidence mass that the particular cell is vacant or occupied by the object at the time instant t. Exemplary evidence masses that may be determined and/or provided per cell at and/or for the time instant t are the (actual) evidence masses $m(SD_t)$, $m(S_t)$, $m(D_t)$, $m(F_t)$ and/or $m(FD_t)$ described herein.

Further, the method comprises determining, based on the occupancy grid, a subset of one or more cells from the plurality of cells belonging to the object at the time instant t. For this purpose, as described in this document, a cluster algorithm may be used that is set up to assign one or more cells of the occupancy grid to a particular object. Furthermore, object attributes and/or object assignments may be used to filter and/or consider the object affiliation of cells across the sequence of time instants. Thus, the one or more cells of the occupancy grid that are part of the (specific) object at the time instant t may be determined in a precise manner.

Further, the method comprises determining a predicted object state of the object for and/or at the time instant t. The predicted object state may be determined based on the object state for the (possibly directly) preceding time instant t−1. In particular, predicted values for the one or more state variables may be predicted and/or determined. One or more prediction equations may be used for this purpose.

The predicted object state for the time instant t (in particular the predicted value of the orientation of the object) may be determined based on the prediction equation $$\hat{\varphi}_t = \varphi_{t-1} + \omega \Delta t$$

Here, $\hat{\varphi}_t$ is the predicted value of the orientation for and/or at the time instant t, $\varphi_{t-1}$ is the determined value of the orientation for and/or at the previous time instant t−1, $\omega$ is a value of the rotation rate of the object, and $\Delta t$ is the time interval between the previous time instant t−1 and the time instant t.

Alternatively or additionally, the predicted object state for and/or at the time instant t (in particular the predicted value of the velocity of the object) may be determined, based on the prediction equation $$\hat{v}_t = v_{t-1} + a \Delta t$$

Here, $\hat{v}_t$ is the predicted value of the velocity for and/or at the time instant t, $v_{t-1}$ is the determined value of the velocity for and/or at the previous time instant t−1, and a is the acceleration of the object.

Alternatively or additionally, the predicted object state for and/or at the time instant t (in particular, the predicted value of a first component (e.g., the x-component) of the position of the object) may be determined based on the prediction equation $$\hat{x}_t^x = x_{t-1}^x + \frac{1}{\omega^2}(\omega \hat{v}_t \sin(\hat{\varphi}_t) + a\cos(\hat{\varphi}_t) - \omega v_{t-1}\sin(\varphi_{t-1}) - a\cos(\varphi_{t-1}))$$

Here, $\hat{x}_t^x$ is the predicted value of the first component of the position for and/or at the time t, and $x_{t-1}^x$ is the determined value of the first component of the position for and/or at the previous time t−1.

Alternatively or additionally, the predicted object state for and/or at the time t (in particular, the predicted value of a second component (e.g., the y-component) of the position of the object) may be determined based on the prediction equation $$\hat{x}_t^y = x_{t-1}^y + \frac{1}{\omega^2}(-\omega \hat{v}_t \cos(\hat{\varphi}_t) + a\sin(\hat{\varphi}_t) + \omega v_{t-1}\cos(\varphi_{t-1}) - a\sin(\varphi_{t-1}))$$

Here, $\hat{x}_t^y$ is the predicted value of the second component of the position for and/or at the time t, and $x_{t-1}^y$ is the determined value of the second component of the position for and/or at the previous time t−1.

Further, the method comprises determining the object state for the and/or at the time instant t based on the predicted object state for the and/or at the time instant t and based on the determined subset of one or more cells of the object. The object state (determined during the previous iteration) for the previous point in time t−1 may be updated by means of an innovation and/or a measurement update. The innovation and/or the measurement update may be updated by the deviation between the predicted object state for the time instant t and an object state based on a (currently) measured object state. The (currently) measured object state may be determined on the basis of the determined subset of one or more cells of the object. In particular, a measurement value of one or more state variables may be determined based on the determined subset of one or more cells of the object.

The object state of the object may thus be determined or updated in an iterative manner at the sequence of time instants. This may be done in particular by means of a Kalman filter, in particular by means of an Unscented Kalman filter. By using an Unscented Kalman Filter, the use of non-linear prediction equations and/or system equations is made possible in an efficient and precise manner.

To determine the predicted values of the one or more state variables, i.e., to determine the predicted object state, a prediction of a plurality of different sigma points in the vicinity of the determined object state may be performed for and/or at the preceding time instant t−1. In particular, the method may comprise determining a plurality of sigma points in an environment of the object state for and/or at the previous time instant t−1. A sigma point comprises values for one or more state variables. In particular, a sigma point may correspond to an object state in the environment of the object state for the previous time instant t−1. Typically, for L different state variables 2L+1 different sigma points are used. The number L of different state variables may be two or more, three or more, or four or more.

Further, the method may comprise determining a plurality of weights for the plurality of sigma points. The weight for a sigma point may depend on how far the sigma point is from the object state for the previous time instant t−1. Typically, the weight decreases with increasing distance.

Further, based on the plurality of sigma points for the previous time instant t−1, the method may determine a corresponding plurality of predicted sigma points for the time instant t. In particular, the one or more prediction equations for the different state variables described in this document may be applied to the individual state variables of a sigma point to determine the predicted sigma point.

Further, the method may comprise determining the predicted object state for the time instant t based on the plurality of predicted sigma points and based on the plurality of weights, in particular as a weighted average of the plurality of predicted sigma points. Thus, even when nonlinear prediction equations are used, a predicted object state may be determined in an efficient and reliable manner.

The object state may include a longitudinal acceleration a of the object. The determination of the predicted object state for the time instant t, in particular the determination of a predicted value $\hat{\alpha}_t$ of the longitudinal acceleration, may be performed on the basis of the determined value $\alpha_{t-1}$ of the longitudinal acceleration for the previous time instant t−1 such that $|\hat{\alpha}_t| \leq |\alpha_{t-1}|$ applies to the amounts of the longitudinal acceleration. It may thus be specified that the magnitude or amount of the predicted longitudinal acceleration decreases relative to the longitudinal acceleration at the previous time and/or achieves a (preferably relatively slow) convergence towards zero. This allows for a robust update of the object state.

Alternatively or additionally, the object state may comprise a rotation rate ω of the object. The determination of the predicted object state for the time instant t, in particular the determination of a predicted value $\hat{\omega}_t$ for the rotation rate, may be performed on the basis of the determined value $\omega_{t-1}$ of the rotation rate for the previous time instant t−1 such that $|\hat{\omega}_t| \leq |\omega_{t-1}|$ applies to the magnitudes. It may thus be specified that the magnitude of the predicted rotation rate decreases relative to the rotation rate at the previous time and/or achieves a (preferably relatively slow) convergence towards zero. This allows for a robust update of the object state.

The method may comprise determining a measured value of a first state variable for the time instant t based on the determined subset of one or more cells of the object. The first state variable may be, for example, the position of the object, the orientation of the object, and/or the velocity of the object.

Further, the method may comprise determining a predicted value of the first state variable from the predicted object state of the object for the time instant t. In other words, a predicted value of the first state variable may be determined (e.g., using a prediction equation). Furthermore, a deviation between the predicted value and the measurement value of the first state variable may be determined. This deviation may also be considered or referred to as an innovation and/or a measurement update. Such a deviation may be determined for a plurality of state variables (in particular for all state variables of the object state).

The object state for the time instant t may then be determined in a precise manner based on the determined deviation. In particular, the object state for the previous time instant t−1 may be updated based on the determined deviation (for the one or more state variables). In this way, the object state of an object may be determined for a sequence of time instants in a particularly reliable and robust manner.

The method may comprise determining a boundary, in particular a bounding box, of the object based on the determined subset of one or more cells of the object. In particular, a boundary may be determined which, on the one hand, is as small as possible and, on the other hand, encloses the determined subset of one or more cells of the object as completely as possible. Thus, a (possibly rectangular) boundary with a certain length and a certain width may be determined.

The (possibly rectangular) boundary may then be used as a kind of mask that is oriented in different ways on the occupancy grid to provide a current measurement value for the orientation of the object. In particular, a plurality of different subsets of cells of the occupancy grid may be determined for a corresponding plurality of orientations of the boundary. For each orientation of the boundary it may be determined which subset of cells of the grid is enclosed by the (differently oriented and/or aligned) boundary.

A cumulative and/or mean evidence or mass of evidence that the respective subset of cells is unoccupied or occupied may then be determined for each of the plurality of different subsets of cells. For each individual orientation of the boundary, a subset of cells of the occupancy grid that are at least partially enclosed by the boundary may be determined. Furthermore, the sum and/or the mean value of the evidences or evidence masses of the cells of the determined subset of cells may be determined as cumulative and/or mean evidence and/or evidence mass.

Further, based on the determined plurality of cumulative and/or average evidences and/or evidence masses, a measurement value for the orientation of the object for the time instant t may be determined. In particular, the orientation of the boundary may be selected that has a maximum cumulative and/or average evidence and/or evidence mass (for the presence of an object). The orientation of the boundary determined in this way may be used as a measurement value for the orientation of the object for and/or at the time instant t. Thus, based on the occupancy grid, an actual measurement value for the orientation of the object for and/or at the time instant t may be determined in an efficient and precise manner.

The determined measurement value may then be compared to the predicted value of the orientation to determine the deviation between the determined measurement value and the predicted value of the orientation. The deviation may be used to determine the object state for the time instant t. This enables reliable, accurate and robust tracking of the object state of an object.

The one or more sensors may comprise at least one velocity-measuring sensor (in particular a radar sensor) configured to detect, for at least a first cell of the object, a (measurement) value of a radial and/or tangential velocity of the first cell for the time instant t. The radial velocity here is the component of the (longitudinal) velocity of the object which is radial to the position of the velocity-measuring sensor (i.e. which runs along the line connecting the position of the velocity-measuring sensor and the position of the first cell). The tangential velocity here is the component of the (longitudinal) velocity of the object that is tangential and/or perpendicular to the line connecting the position of the velocity measuring sensor and the position of the first cell. A velocity-measuring sensor (in particular a radar sensor, a lidar sensor and/or a camera sensor) typically enables precise and direct determination of the radial and/or the tangential velocity.

The method may comprise determining a predicted and/or expected value of the radial and/or tangential velocity of the first cell for the time instant t. The predicted and/or expected value of the radial and/or tangential velocity may be determined based on the predicted object state of the object for the time instant t. In particular, based on the predicted value of the (longitudinal) velocity of the object displayed in the predicted object state, the predicted and/or expected value of the radial and/or tangential velocity (with respect to the position of the velocity measuring sensor) may be determined. Thus, based on the predicted value of the (longitudinal) velocity of the object (which results from the predicted object state), a predicted and/or expected value of the radial and/or tangential velocity may be calculated. For this purpose, a geometric relationship between the position of the first cell and the position of the velocity measuring sensor may be considered.

The deviation between the predicted and/or expected value and the detected (measurement) value of the radial and/or the tangential velocity of the first cell for the time instant t may then be determined. This deviation may be used as an innovation and/or a measurement update to determine the object state for the time instant t. Thus, a measured value of the velocity of the one or more cells of the object may be taken into account in an efficient and precise manner.

The predicted and/or expected value of the radial velocity of the first cell for the time instant t may be determined based on the equation $$h_i^r(\hat{\xi}_{\tau,t}) = \hat{v}_{\tau,t,\xi}\cos(\theta_{z,i}^\tau - \hat{\varphi}_{\tau,t,\xi}) + \hat{\omega}_{\tau,t,\xi}\left(\sin(\theta_{z,i}^\tau)(x_{s,i}^x - \hat{x}_{\tau,t,\xi}^x) - \cos(\theta_{z,i}^\tau)(x_{s,i}^y - \hat{x}_{\tau,t,\xi}^y)\right)$$

Here, $\hat{v}_{\tau,t,\xi}$ is the predicted value of the longitudinal velocity of the first cell and/or object, $\hat{x}_{\tau,t,\xi}^x$ is the predicted value of the first component of the position of the first cell and/or object, $\hat{x}_{\tau,t,\xi}^y$ is the predicted value of the second component of the position of the first cell and/or object.

Further, $\hat{\varphi}_{\tau,t,\xi}$ indicates the predicted value of the orientation of the first cell and/or object, $h_i^r(\hat{\xi}_{\tau,t})$ indicates the predicted and/or expected value of the radial velocity of the first cell and/or object, $x_{s,i}^x$ indicates the value of the first component of the position of the velocity measuring sensor, $x_{s,i}^y$ indicates the value of the second component of the position of the velocity measuring sensor, and $\theta_{z,i}^\tau$ is the azimuth angle of the position of the first cell and/or object relative to the position of the velocity measuring sensor. In particular, $\theta_{z,i}^\tau$ is the azimuth angle of a measurement of the velocity-measuring sensor imaged in the first cell and/or in the object relative to the position of the velocity-measuring sensor (i.e., the radial measurement direction of the velocity-measuring sensor). The above equation results, for example, from the geometrical considerations in relation to FIG. 6.

In a preferred example, predicted and/or expected values $h_i^r(\hat{\xi}_{\tau,t})$ of the radial velocity of the first cell are determined for the plurality of sigma points. The effective predicted and/or expected value of the radial velocity of the first cell is then precisely obtained as a weighted average of the predicted and/or expected values $h_i^r(\hat{\xi}_{\tau,t})$ of the radial velocity for the plurality of sigma points.

The method may comprise determining, on the basis of positions of the determined subset of one or more cells of the object, and on the basis of an orientation of the object, a length and/or a width of a (rectangular) boundary and/or bounding box of the object. The (previously determined) orientation of an object may thus be used to determine the length and/or width of a bounding box in a precise manner.

Further, the method may comprise determining a position of a reference point at or in the bounding box as a measurement value of the position of the object for the time instant t. Furthermore, from the predicted object state a predicted value of the object's position results. A deviation between the predicted value and the measured value of the position of the object for the time instant t may then be determined as an innovation and/or as a measurement update. Furthermore, the object state for the time instant t may be determined in a precise and robust manner based on the determined deviation.

Based on the occupancy grid, an occupancy measure may be determined for the fact that the respective (immediate) environment of edges of the object's bounding box is not occupied. In particular, the occupancy measure may indicate how clear the immediate vicinity of each edge of the bounding box (and thus how well visible or detectable each edge of the bounding box) is. The reference point for determining and/or updating the position of an object may then be selected and/or determined as a particular point on a particular edge of the bounding box, depending on the determined occupancy measure. In particular, at least one edge may be determined (based on the occupancy measure) that is relatively isolated from one or more other objects, and thus readily detectable. The reference point may then be placed on this edge. By selecting a suitable reference point, a particularly precise and robust determination of the position of an object may be made possible.

At least some of the cells of the occupancy grid may display motion information related to a movement of the respective cell. The movement information may indicate, for example, the direction of movement and/or the speed of movement. The motion information may be determined, for example (as described in this document), on the basis of particles and/or on the basis of a particle filter.

As part of the method, a new object may be detected at a specific point in time (based on the occupancy grid). Furthermore, a subset of cells may be determined for the new object (based on the occupancy grid). Further, the object state for the new object may be determined based on positions of the determined subset of cells for the new object and/or based on movement information of the determined subset of cells for the new object. In particular, the position and/or orientation of the new object may be determined based on the positions of the determined subset of cells for the new object. Alternatively or complementarily, the velocity of the new object may be determined based on the motion information of the determined subset of cells for the new object. This allows a precise initialization of the object state for a new object.

According to one aspect, a method for determining a value of a size of an object in a spatial area is described. The spatial area may include a plurality of cells. The method may be carried out by an evaluation unit of a vehicle. The spatial area may comprise or be an environment of the vehicle. The size of the object may be a length and/or a width (of a bounding box) of the object. The aspects described in connection with this method may be combined in any manner with individual aspects of the method described further above (and/or vice versa).

The method may be performed in an iterative manner for successive time instants of a sequence of time instants. The method steps described below are carried out at one time instant t.

The method comprises determining, based on sensor data from one or more sensors with respect to the spatial area, an occupancy grid indicating, for each of the plurality of cells, an evidence and/or evidence mass that the respective cell is vacant or occupied by the object at the time instant t. Further, the method comprises determining, based on the occupancy grid, a subset of one or more cells from the plurality of cells belonging to the object at the time instant t. The occupancy grid and/or subset of cells may be determined and updated at a point in time t as described in this document.

Further, the method comprises detecting, based on the occupancy grid, two opposing bounding edges of the object. In particular, a (rectangular) boundary and/or bounding box may be determined based on the determined subset of cells of the object. Based on the boundary and/or bounding box, there are then two opposite pairs of edges, in particular the front and back edges or the left and right edges.

Further, the method comprises determining a measurement value of the size of the object for the time t, based on a distance between the detected edges of the object. In particular, based on the distance between the leading and trailing edges, the length (of the bounding box) of the object may be determined. Alternatively or additionally, the width (of the bounding box) of the object may be determined on the basis of the distance between the left and right edges.

Further, the method comprises determining, based on the occupancy grid, a measure of quality indicating how well the two opposing edges of the object could be detected. The quality measure may indicate, for example, how clear the immediate surroundings of the individual edges are. A relatively clear environment typically indicates that an edge may be detected with relatively high accuracy.

Further, the method comprises determining, based on the quality measure, a measurement probability distribution of the size of the object for the time instant t. Here, the measurement probability distribution shows the probability of different values of the size of the object around the measurement value. In particular, the measurement probability distribution may indicate the accuracy with which the measurement value for the size of the object could be determined based on the edges. If the edges could be detected relatively well (as indicated, for example, by a relatively high quality measure), the measurement probability distribution may be relatively narrow around the measurement value. On the other hand, the measurement probability distribution may be relatively wide, especially for values above the measurement value, if the edges could only be detected relatively poorly (which is indicated, for example, by a relatively low quality measure).

Further, the method may comprise determining a cumulative probability distribution for time instant t based on the measurement probability distribution for time instant t and starting from the cumulative probability distribution for a previous time instant t−1. In particular, the cumulative probability distribution for the previous time instant t−1 may be updated using the current measurement probability distribution for the time instant t to determine the cumulative probability distribution for the time instant t. This makes it possible to take into account the accuracy of the measurement values of the size of the object at different points in time in order to determine the size of the object in a particularly precise manner. In particular, the value of the size of the object for time instant t may be determined in a precise manner based on the cumulative probability distribution for time instant t.

The measurement probability distribution may comprise, at least in some areas, a normal distribution of values around the measurement value (in particular for values below the measurement value). Alternatively or additionally, the measurement probability distribution may be such that the measurement probability distribution for values greater than the measurement value increasingly approaches a uniform distribution as the quality measure decreases. The measurement probability distribution may be asymmetric. In particular, the measurement probability distribution for values below the measurement value may be independent of the quality measure, while the measurement probability distribution for values above the measurement value is dependent on the quality measure. Thus, it may be taken into account that based on the edges, typically a lower limit of the size (in particular the length and/or the width) of the object may be determined in a precise manner, but not the upper limit of the size of the object.

In particular, the measurement probability distribution may depend on and/or be given by the following function:

$$p(l|z_t^{l,\vartheta}) \propto \exp\left(-\frac{(l-l_z)^2}{2\zeta l, \vartheta \sigma_l^2}\right),$$

$$\zeta l, \upsilon = \begin{cases} (\vartheta_z^{front} \vartheta_z^{rear})^{-1}, & \text{if } l \geq l_z, \\ 1, & \text{else} \end{cases}$$

Here, $l$ is a value of the size of the object and $l_z$ is the measurement value of the size of the object. $\sigma_l^2$ is the variance of the measurement value resulting, for example, from the measurement method used to determine the measurement value. $\vartheta_z^{front} \vartheta_z^{rear}$ is the quality measure for the quality of edge detection, and may be composed of, for example, a measure of visibility for the two edges, i.e. $\vartheta_z^{front}$ and $\vartheta_z^{rear}$. Furthermore, $p(l|z_t^{l,\vartheta})$ is the measurement probability distribution for time instant t.

The cumulative probability distribution may be described by a plurality of probability values $p_{l_\tau,t}^i$ for a corresponding plurality of size intervals i, with i=1, . . . , $I_l$. The number $I_l$ of size intervals may be, for example, 5 or more, 10 or more, or 20 or more.

The cumulative probability distribution $p(l_\tau|z_{1:t}^{l,\vartheta})$ for the time instant t may then be piecewise approximated by $$p(l_\tau|z_{1:t}^{l,\vartheta}) \approx \frac{p_{l_\tau,t}^i}{\delta_i},$$

$$l_\tau \in \left(l_i - \frac{\delta_i}{2}, l_i + \frac{\delta_i}{2}\right)$$

Here, $l_\tau$ is the value of the size of the object determined for time instant t, $\delta_i$ is an interval size of the size interval i, and $l_i$ is a mean value of the size interval i. The piecewise calculation of the cumulative probability distribution enables an efficient and precise determination of the cumulative probability distribution.

The probability value $p_{l_\tau,t}^i$ for a magnitude interval i for the time instant t may be updated starting from the probability value $p_{l_\tau,t}^i$ for the magnitude interval i for the previous time t−1. In particular, an iterative determination of the cumulative probability distribution is enabled. Here, the probability value $p_{l_\tau,t}^i$ for a size interval i for the time instant t may be determined in a more precise manner as follows $$p_{l_\tau,t}^i = \frac{p(l_i | z_t^{l,\vartheta}) p_{l_\tau,t-1}^i}{\sum_{j=1}^{I_l} p(l_j | z_1^{l,\vartheta}) p_{l_\tau,t-1}^j}$$

wherein $p(l_i|z_t^{l,\vartheta})$ is the measurement probability distribution for the point in time for a mean value $l_i$ of the size interval i.

As stated above, the object may be described by a bounding box, the bounding box having a length and a width. The size of the object may be the length and/or the width of the bounding box. Further, the two opposing bounding edges of the object may be the leading edge and the trailing edge of the bounding box when the length of the bounding box is determined as the size of the object. Alternatively or complementarily, the two opposing bounding edges of the object may be the right edge and the left edge of the bounding box when the width of the bounding box is determined as the size of the object.

The method may comprise assigning the object to one class of a plurality of classes of road users. Example classes are: a car, a truck, a pedestrian, a motorcycle, a bicycle, etc. Assignment to a class may be done using the method described in this document.

Further, the method may comprise determining a class probability distribution for the size of objects from the assigned class. The class probability distributions for different object classes may be determined and provided in advance (e.g. based on measurements).

Further, the method may comprise combining the class probability distribution for the assigned class with the cumulative probability distribution for time instant t to determine a combined probability distribution for time instant t. In particular, the class probability distribution may be multiplied by the cumulative probability distribution to obtain the combined probability distribution. The value of the size of the object for time instant t may then be determined in a precise manner based on the combined probability distribution for time instant t (in particular, as the expected value of the combined probability distribution). By taking into account the class to which the object has been assigned, the value of the size of the object may be determined with increased accuracy and/or reliability (even if the edges of the object may only be detected relatively poorly on the basis of the sensor data and/or if only a lower limit of the object size is visible).

As discussed above, the cumulative probability distribution may be described by a plurality of probability values $p_{l_\tau,t}^i$ for a corresponding plurality of size intervals i, where i=1, . . . , $I_l$. $p(l_i|k_\tau^*)$ may be the class probability for a mean value $l_i$ of the size interval i of the size of the object for the object class $k_\tau^*$. A plurality of combined probability values $p_{comb}^{i,l}$ for the corresponding plurality of size intervals i may then be determined based on the respective product $p(l_i|k_\tau^*) p_{l_\tau,t}^i$, for i=1, . . . , $I_l$. Determining the value of the size of the object may then include selecting a size interval from the plurality of size intervals, based on the plurality of combined probability values $p_{comb}^{i,l}$. In this way, the value of the size of the object may be determined in an efficient and precise manner.

The method described herein may comprise determining a plurality of class probability distributions p(l|k) for the size of objects from a corresponding plurality of different classes k∈K (e.g., based on measurements on actual objects). In other words, class-specific class probability distributions p(l|k) for the size of objects of the respective class may be determined and/or provided for a plurality of different object classes k∈K, e.g., for the expected length and/or width of an object.

Further, the method may comprise determining a plurality of combined probability distributions for the time t for the plurality of different classes k∈K. The plurality of combined probability distributions may be determined based on the cumulative probability distribution for time instant t and based on the plurality of class probability distributions p(l|k).

An assignment of the object to a class $k_\tau^*$ from among the plurality of different classes k∈K may then be performed in a precise and efficient manner based on the plurality of combined probability distributions for the time instant t. The cumulative probability distribution may thus (if necessary) also be used to classify the object in an efficient way.

The method may comprise determining a plurality of a priori probabilities p(k) for the plurality of different classes k∈K. The a-priori probabilities p(k) may be determined on the basis of measurements in advance to the execution of the method. The plurality of combined probability distributions for time instant t may then also be determined based on the plurality of a priori probabilities p(k). By taking into account the a priori probabilities p(k) of the different classes, the quality of classification of objects may be further increased.

The method may comprise determining, based on the occupancy grid and/or based on the sensor data, a velocity of the object. In particular, a maximum value of the velocity of the object may be determined (e.g., using the method described in this document). Assigning the object to a class $k_\tau^*$ from the plurality of different classes k∈K may then also be done on the basis of the determined velocity of the object. In particular, the determined velocity of the object may be used to exclude one or more object classes (which typically cannot achieve the determined velocity of the object). By taking into account the speed of the object, the classification may be further improved.

The method may include determining a plurality of expected values for the plurality of combined probability distributions for the time instant t. Here, the expected value $E_L[p(L_\tau|k)]$ for class k may be calculated as $$E_L[p(L_\tau|k)] = \sum_{i=1}^{l_i} p(l_i|k) p_{l_\tau,t}^i$$

where p(l$_i$|k) is the class probability of the class k for a mean value l$_i$ of the size interval i of the size of the object. Assigning the object to a class $k_\tau^*$ from the plurality of different classes k∈K may then be done in a particularly precise manner based on the plurality of expected values.

The methods described in this document may each comprise providing a driving function of a vehicle as a function of the determined object state and/or as a function of the determined value of the size of the object. For example, the driving function may comprise at least partially automated longitudinal and/or lateral guidance of the vehicle. In other words, a vehicle may be operated based on the determined object state and/or the determined value of the size of an object in the environment of the vehicle. This enables reliable operation of the vehicle.

The one or more sensors may include a radar sensor and/or a lidar sensor of a vehicle. The spatial area may include an environment of the vehicle that may be detected by the one or more sensors of the vehicle.

According to another aspect a software (SW) program is described. The SW program may be set up to be executed on a processor (e.g. on a vehicle controller) and thereby execute one of the methods described in this document.

According to another aspect a storage medium is described. The storage medium may include an SW program that is configured to be executed on a processor and thereby to execute one of the methods described in this document.

According to another aspect, a processing unit for a vehicle is described wherein the processing unit is configured to carry out one of the methods described in this document.

According to another aspect, a (road) vehicle (in particular a passenger motor vehicle or a truck or a bus or a motorcycle) is described, which includes the processing unit described in this document.

It should be noted that the methods, devices and systems described in this document may be used alone and also in combination with other methods, devices and systems described in this document. Furthermore, any aspect of the methods, devices and systems described in this document may be combined in a variety of ways. In particular, the features of the claims may be combined in a variety of ways.

BRIEF DESCRIPTION OF THE FIGURES

The invention is further described in detail by means of embodiments. In which.

DETAILED DESCRIPTION

Figure 1:
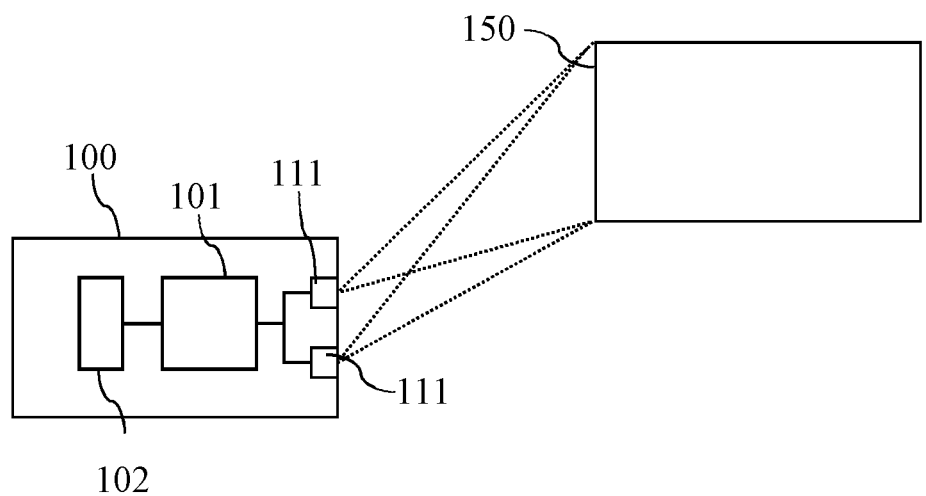
FIG. 1 shows an exemplary vehicle with a number of different environment sensors.

As explained at the beginning, the present document deals with the detection and, in particular, the tracking of the state of at least one object based on sensor data from one or more environment sensors. In this context, FIG. 1 shows a vehicle 100 with one or more environment sensors 111 for the detection of sensor data. The vehicle 100 also includes a processing unit 101, which is configured to detect an object 150 in the environment of vehicle 100 on the basis of the sensor data. A detected object 150 may be considered in a vehicle function 102 (e.g. for partially automated or highly automated driving of the vehicle 100).

In particular, the present document is concerned with consistent multisensory modeling of the environment of a vehicle 100 that represents static obstacles, drivable or clear areas, and/or dynamic objects 150 at different levels of abstraction and estimates them holistically. The local environment of a vehicle 100 may be estimated and/or displayed as a Dynamic Occupancy Grid Map and/or raster 200 (see FIG. 2).

Figure 2:
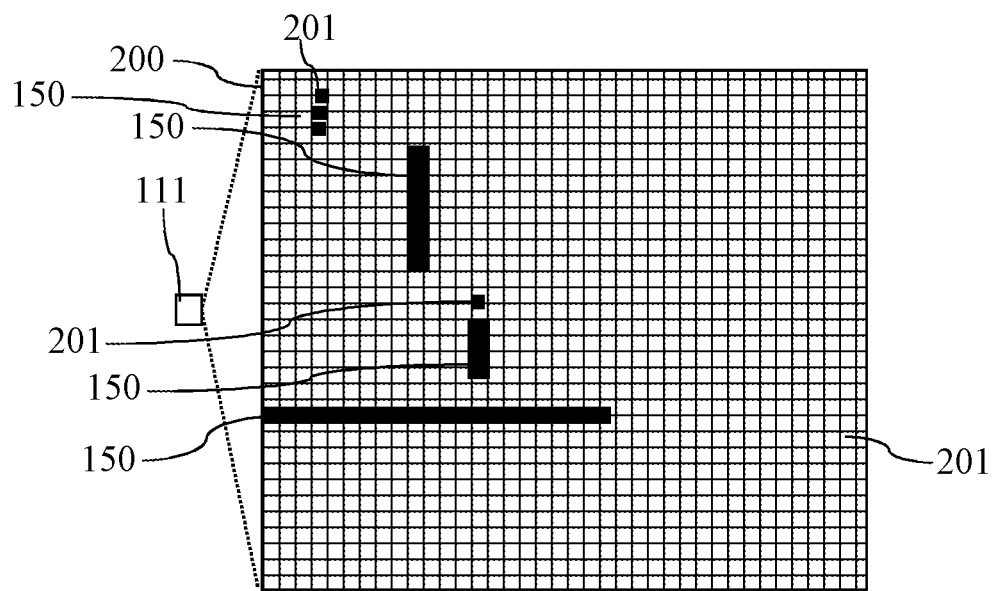
FIG. 2 shows an example of a grid of a vehicle environment.

FIG. 2 shows an exemplary grid 200 of an environment of the vehicle 100 with a large number of grid cells or in short cells 201. The grid 200 may divide the environment and/or the surrounding of the vehicle 100 into the plurality of two- or three-dimensional cells 201. In this regard, a two-dimensional cell 201 may have or be a rectangular shape (for example, having an edge length of 10 cm or less, 5 cm or less, 2 cm or less, or 1 cm or less).

The processing unit 101 may be set up to determine measurement data for one or more of the cells 201 (in particular for each cell 201) on the basis of the sensor data, indicating whether a cell 201 is occupied or not at a certain point in time t. In particular, the measurement data z, for a cell c 201 may display $$z_c = (m(SD_{z,t}), m(F_{z,t})),$$

wherein m(SD)=m({S,D}) is evidence and/or evidence mass that the cell c 201 is occupied by an object 150 that cannot be uniquely identified as static ("S") or dynamic ("D"), and wherein m(F) is evidence that the cell c 201 is free ("F"), and thus is not occupied by an object 150 (and thus is a free cell 201). The evidence m(SD) that the cell 201 is occupied by an object 150 may be considered as object probability and/or as the lower barrier of the object probability that the cell 201 is occupied by an object 150 (especially in the sense of the Dempster-Shafer theory). The evidence masses may be values between 0 and 1. The sum of the evidence masses of a cell 201 (for the different hypotheses) may be normalized to the value 1.

Typically, only the evidence and/or evidence masses m(SD) and m(F) may be determined on the basis of a temporally isolated measurement at a certain point in time t, since it cannot be determined whether the object is occupied by a static or a dynamic object 150. However, it may be assumed that after a sequence of measurements at a corresponding sequence of points in time at the current point in time t, an occupancy grid $\mathcal{M}$ 200 may be provided, which shows different evidence for different hypotheses for the different cells 201, $$\mathcal{M}_t = \{m(S_t), m(D_t), m(SD_t), m(F_t), m(FD_t)\},$$

wherein m(FD$_t$)=m({F, D}$_t$) indicates evidence for the hypothesis that a cell 201 which has not been occupied in the past, i.e. which has been measured as free ("F") in a measurement, continues to be free ("F") or is occupied by a dynamic object 150 ("D") at the time t, thus representing overall an area which is in principle transversable or passable for a dynamic object 150. Furthermore, m(S$_t$) indicates the evidence and/or evidence mass for the fact that cell c 201 is occupied by a static object 150 at the point in time t. Furthermore, m(D$_t$) indicates the evidence and/or evidence mass for the fact that the cell c 201 is occupied by a dynamic object 150 at the point in time t. The occupancy grid $\mathcal{M}_t$ describes the status or state of the cells 201 of the grid 200 at a particular time t. The evidences or evidence masses of the occupancy grid $\mathcal{M}_t$ 200 determined considering the current sensor data at the current time t are also referred to as actual evidence masses in this document.

Figure 3:
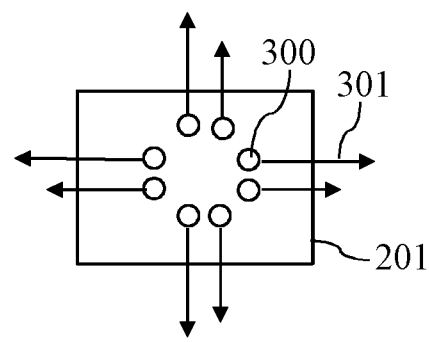
FIG. 3 shows exemplary particles of a cell of a grid.

The movement of a possible object 150 may be described by so-called particles. To this end, the evidence mass of a cell 201 for the hypothesis that a moving object 150 is present may be divided among a plurality of particles. In particular, the actual evidence mass m(D$_{t-1}$) and/or the actual evidence mass m(SD$_{t-1}$) for the time t−1 may be divided among a plurality of particles 300 (see FIG. 3). In this regard, the particles 300 may have different motions 301 and/or different hypotheses of motion. In particular, the different movements 301 may have different speeds and/or different directions of movement. For example, a spatial resolution of 360°/R R may be used to account for different directions of motion, and a particular value resolution V may be used to account for different velocities, such that different particles 300 are initialized in a cell 201 R×V. Thus, when initializing particles 300 for a cell 201, it may be assumed that the object 150, to which the cell 201 belongs, may move arbitrarily.

The (actual) occupancy grid $\mathcal{M}_{t-1}$ 200 (at a previous time point t−1) and the particles 300 may be used to predict an occupancy grid $\overline{\mathcal{M}}_t$ for a (current) time instant t. In other words, the (predicted) occupancy grid $\overline{\mathcal{M}}_t$ for the point in time t may be predicted from the (actual) occupancy grid $\mathcal{M}_{t-1}$ and/or the particles 300 for a previous point in time t−1. The following may be assumed for the evidence masses, $$m(S'_t) = m(S_{t-1}),$$
$$m(SD'_t) = m(SD_{t-1}),$$
$$m(D'_t) = 0,$$
$$m(F'_t) = 0,$$
$$m(FD'_t) = \frac{m(FD_{t-1}) + m(F_{t-1})}{1 - m(D_{t-1})}$$

The apostrophe (') indicates that the evidence is a (statically) predicted evidence mass. Thus, static aspects from the (actual) occupancy grid $\mathcal{M}_{t-1}$ of the previous time instant t−1 may be transferred to the time instant t to determine a statically predicted occupancy grid $\mathcal{M}'_t$.

The dynamic aspects may be taken into account by means of the particles 300. In particular, for each cell 201, the sum of the (particle) evidence masses of the particles 300 which fall into the respective cell 201 at the point in time t may each be determined. Based on this, the evidence mass for the fact that a cell 201 is a dynamic object 150 may be determined, e.g.

$$m(\hat{D}^c_t) = \min\left(1 - \varepsilon_o, \sum_{x \in \hat{x}^c_t} o_x\right), \varepsilon_o \in (0, 1)$$

wherein $\Sigma o_x$ is the sum of the (particle) evidence masses of the particles 300 falling into a particular cell 201, and wherein $\varepsilon_o$ is an adjustable constant between 0 and 1. The min (□) function may be used to ensure that the (dynamically) predicted evidence mass m($\hat{D}_t$) of a cell c 201 does not exceed one. Thus, a dynamically predicted occupancy grid $\widehat{\mathcal{M}}_t$ is obtained based on the particles 300.

The dynamically predicted occupancy grid $\hat{\mathcal{M}}_t$ and the statically predicted occupancy grid $\mathcal{M}'_t$ may be superimposed to determine a predicted occupancy grid $\overline{\mathcal{M}}_t$, e.g. by $$\overline{\mathcal{M}}_t = (1-\bar{\varepsilon})(\hat{\mathcal{M}}_t \oplus \mathcal{M}'_t).$$

A temporal uncertainty factor $\bar{\varepsilon}$ may be taken into account in the combination.

For compatible hypotheses and/or evidence masses, the dynamically predicted occupancy grid $\hat{\mathcal{M}}_t$ and the statically predicted occupancy grid $\mathcal{M}'_t$ may be combined by multiplying the evidence masses. On the other hand, a conflict may be present in case of conflicting hypotheses. In particular, this may be the case when an evidence mass $m(\hat{D}_t)$ is predicted for a cell 201 via dynamic prediction $\hat{\mathcal{M}}_t$ and an evidence mass $m(S'_t)$ is predicted via static prediction $\mathcal{M}'_t$. A robust approach for conflict resolution may be to use the actual evidence mass $m(S_{t-1})$ of the previous time instant t−1 as the predicted evidence mass $m(\overline{S}_t)$ in this case.

Thus, a predicted occupancy grid $\overline{\mathcal{M}}_t$ may be determined on the basis of the actual occupancy grid $\mathcal{M}_{t-1}$ and the particles 300 for a previous point in time (t−1).

In addition, new measurements are available for the individual cells 201 at the point in time t, which may be summarized in a measured occupancy grid $\mathcal{M}_{z,t}$. In doing so, the measured occupancy grid $\mathcal{M}_{z,t}$ may display the evidence masses $m(SD_{z,t})$ and $m(F_{z,t})$ for each cell 201. The predicted occupancy grid $\overline{\mathcal{M}}_t$ may then be combined with the measured occupancy grid $\mathcal{M}_{z,t}$ to determine the actual occupancy grid $\mathcal{M}_t$ at time t, i.e.

$$\mathcal{M}_t = \overline{\mathcal{M}}_t \oplus \mathcal{M}_{z,t}$$

The combination of the evidence masses may in turn be executed by multiplying evidence masses for compatible hypotheses. On the other hand, incompatible hypotheses may lead to conflicts. In particular, such a conflict may occur when the current measurement data indicates an evidence mass for a non-occupied cell 201, i.e., $m(F_{z,t})$, while the predicted occupancy grid $\overline{\mathcal{M}}_t$ indicates evidence masses for a static object, a dynamic object, or an object 150 that is not uniquely static or dynamic. The resulting conflict evidence masses $$\zeta(\overline{\mathcal{M}}_t, \mathcal{M}_{z,t}) = \underbrace{m(\hat{S}_t)m(F_{z,t})}_{\zeta_1} + \underbrace{m(\overline{D}_t)m(F_{z,t})}_{\zeta_2} + \underbrace{m(\overline{SD}_t)m(F_{z,t})}_{\zeta_3}$$

may e.g. be associated with the different hypotheses as follows, $$m(S_t) \leftarrow \frac{1}{2}\zeta_1,$$

$$m(F_t) \leftarrow \frac{1}{2}\zeta_1 + \zeta_2 + \zeta_3$$

When determining a measured occupancy grid $\mathcal{M}_{z,t}$, typically no evidence mass is determined for the hypotheses "static object" and/or "dynamic object", but only the evidence mass $m(SD_{z,t})$ for the fact that a cell 201 is occupied by an unspecified object 150. As a result, combining the predicted occupancy grid $\overline{\mathcal{M}}_t$ with the measured occupancy grid $\mathcal{M}_{z,t}$ would only increase the evidence mass for the hypothesis SD, but not the evidence mass for the hypotheses S and/or D.

To increase the accuracy of an occupancy grid $\mathcal{M}_t$ at the point in time t, the evidence mass for the hypothesis SD may be devided, i.e.

$$m(SD \mid \overline{\mathcal{M}}_t \oplus_c \mathcal{M}_{z,t}) = \underbrace{m(\overline{SD}_t)m(\theta_{z,t})}_{\lambda_1} + \underbrace{m(\overline{SD}_t)m(SD_{z,t})}_{\lambda_2} + \underbrace{m(\overline{\theta}_t)m(SD_{z,t})}_{\lambda_3}$$

to the hypotheses SD, S and D. Here, $m(SD \mid \overline{\mathcal{M}}_t \oplus_c \mathcal{M}_{z,t})$ may describe the Dempster-Shafer evidence combination, in this case for the hypothesis SD, given the predicted occupancy grid $\overline{\mathcal{M}}_t$ and the measured occupancy grid $\mathcal{M}_{z,t}$ without normalization and/or consideration of conflicts. In other words, $m(SD \mid \overline{\mathcal{M}}_t \oplus_c \mathcal{M}_{z,t})$ may describe the multiplication of the evidence masses of the hypotheses whose intersection corresponds to the described hypothesis, in this case the hypothesis SD with the associated combined set {S,D} from the hypotheses of a static object S or a dynamic object D. The breakdown may be as follows, $$m(SD_t) \leftarrow \lambda_1)$$
$$m(S_t) \leftarrow \lambda_2$$
$$m(D_t) \leftarrow f_D\lambda_3,$$
$$m(SD_t) \leftarrow (1-f_D)\lambda_3$$

where $f_D$ is a positive number less than one, which may depend on the number of particles 300 in the cell 201 under consideration. Alternatively or in addition, $f_D$ may depend on the measurement value of the radial velocity of the cell 201 under consideration, whereby the measurement value may be detected e.g. by a radar sensor 111. Thereby $f_D$ may increase with increasing speed.

On the other hand, the evidence mass that would be associated when combining the hypothesis for a dynamic object 150 may be at least partially redistributed to the hypothesis SD in order to take into account measurement errors or erroneous simplifications of the measurement models of the respective sensors. For the evidence mass for the hypothesis D the following results $$m(D \mid \overline{\mathcal{M}}_t \oplus_c \mathcal{M}_{z,t}) = m(\overline{D}_t)(1 - m(F_{z,t})) + \underbrace{m(\overline{FD}_t)m(SD_{z,t})}_{\lambda_4}$$

The corresponding term $\lambda_4$, which is the combination of the predicted evidence mass $m(\overline{FD}_t)$ of the FD hypothesis, i.e., the hypothesis that cell 201 is free or dynamically occupied, and the measured evidence mass $m(SD_{z,t})$ of the SD hypothesis for an occupancy that is not further classified, may be redistributed as follows $$m(D_t) \leftarrow (1-\gamma)\lambda_4 + f_D\gamma\lambda_4,$$
$$m(SD_t) \leftarrow (1-f_D)\gamma\lambda_4,$$

where $\gamma$ is a design parameter between 0 and 1.

The resulting evidence masses of the actual occupancy grid $\mathcal{M}_t$ at the point in time t thus result to be $$m(S_t) = m(S \mid \mathcal{M}_t \oplus_c \mathcal{M}_{z,t}) + \frac{1}{2}\zeta_1 + \lambda_2,$$

$$m(D_t) = m(D \mid \overline{\mathcal{M}}_t \oplus_c \mathcal{M}_{z,t}) - (1-f_D)\gamma\lambda_2 + f_D\lambda_3,$$

$$m(SD_t) = m(SD \mid \overline{\mathcal{M}}_t \oplus_c \mathcal{M}_{z,t}) - \lambda_2 - f_D\lambda_3 + (1-f_D)\gamma\lambda_4$$

$$+ m(F_t) = m(F \mid \overline{\mathcal{M}}_t \oplus_c \mathcal{M}_{z,t}) + \frac{1}{2}\zeta_1 + \zeta_2 + \zeta_3,$$

$$m(FD_t) = m(FD \mid \overline{\mathcal{M}}_t \oplus_c \mathcal{M}_{z,t}).$$

In addition to determining an actual occupancy grid $\mathcal{M}_t$ for the point in time t, the distribution of the particles 300 may be updated to generate an up-to-date image of the dynamic aspects, especially the direction of movement of one or more objects 150, of an environment. For this purpose, the evidence mass for the hypothesis of a dynamic object 150, i.e. $m(D_t)$, may be distributed across a plurality of particles 300. The number of particles 300 for a cell 201 may be proportional to the evidence mass $m(D_t)$ of the cell 201.

For example, the density of particles 300 for a cell 201 may e.g. be selected as $$p^c = m(D_t^c) + (1-f_D)(\lambda_3 + \gamma\lambda_4)$$

and may thus be selected depending on the evidence mass for a dynamic object D and depending on an evidence mass m(SD) increased by the current measurement $\mathcal{M}_{z,t}$, which may possibly correspond to a dynamic object. In addition, the evidence mass for a static object S may also be considered, wherein a higher evidence mass $m(S_t)$ reduces the density of particles 300, since the particles 300 correspond to the hypotheses of dynamic objects. The density of the particles 300 may be multiplied by a maximum value of particles 300 for a cell 201 to determine the adaptive number of particles 300 for a cell 201. Alternatively, the number of particles 300 in a cell 201 may be selected independently of the evidence masses and defined e.g. to a constant fixed value.

Of the available particles 300, at least a portion may be derived from the predicted particles 300 of the previous time instant (t−1) that were predicted into the respective cell 201. This allows filtering along the direction of movement of an object 150. Furthermore, a (relatively low) number of randomly distributed new particles 300 may be generated. Thus, the robustness of the iterative method for updating an actual occupancy grid $\mathcal{M}_t$ may be increased. The total dynamic evidence mass $m(D_t)$ of a cell 201 may be evenly distributed among the total number of particles 300 of the cell 201, such that the sum of the (particle) evidence masses $\Sigma o_\chi$ of all particles 300 of the cell 201 corresponds to the dynamic evidence mass $m(D_t)$ of this cell 201. The updated particles 300 may then in turn be used to determine a dynamically predicted occupancy grid $\widehat{M}_{t+1}$ for a subsequent time instant t+1.

An (actual) occupancy grid $\mathcal{M}_t$ (comprising actual evidence masses $m(S_t)$, $m(D_t)$, $m(SD_t)$, $m(F_t)$, $m(FD_t)$ for each cell 201 of the grid 200) may thus be iteratively updated based on sensor data from one or more environmental sensors 111. The iterative method may be repeated for a sequence of time instants t−1, t, t+1, t+2, . . . , e.g., at a repetition rate or sampling frequency of 1 Hz, 10 Hz, 100 Hz, or more. At a current point in time t, a measured occupancy grid $\mathcal{M}_{z,t}$ may be determined based on the sensor data (which includes measured evidence masses $m(SD_{z,t})$, $m(F_{z,t})$ for each cell 201 of the grid 200). The measured occupancy grid $\mathcal{M}_{z,t}$ may be combined with a predicted occupancy grid $\overline{M}_t$ to determine the actual occupancy grid $\mathcal{M}_t$. The predicted occupancy grid $\overline{M}_t$ may be determined by combining a statically predicted occupancy grid $\mathcal{M}'_t$ and a dynamically predicted occupancy grid $\widehat{M}_t$. The statically predicted occupancy grid $\mathcal{M}'_t$ may be predicted and/or determined from the (actual) occupancy grid $\mathcal{M}_{t-1}$ of the previous time instant (t−1) by a mapping process. The dynamically predicted occupancy grid $\widehat{M}_t$ may be determined by a particle tracking process from the actual D evidence mass $m(D_{t-1})$ of the individual cells 201 at the previous point in time (t−1). The particle tracking process may include a resampling step, in which the actual D evidence mass $m(D_{t-1})$ of a cell 201 is distributed to old and/or new particles 300. Based on the movement 301 of these particles 300, a movement and/or distribution of the particle evidence masses within the grid 200 may then be predicted to the current point in time t. The distribution of particle evidence masses at the current time instant t may then be used to determine the dynamically predicted D evidence mass $m(\hat{D}_t)$ of the individual cells 201 (e.g., based on the sum of the particle evidence mass in the respective cell 201).

Thus, a corresponding sequence of actual occupancy grids $\mathcal{M}_t$ 200 having actual evidence masses, e.g., $m(SD_t)$, $m(S_t)$, $m(D_t)$, $m(F_t)$, and/or $m(FD_t)$, may be determined at a sequence of time instants t. Based on these actual evidence masses for the individual cells 201, a clustering algorithm may be used to detect (possibly new) objects 150, and the individual cells 201 may be assigned to one or more (dynamic) objects 150. Further, the object association determined in a previous time instant t−1 may be used to predict an object association for the current time instant t. The predicted object assignment may be overlaid with the object assignment determined on the basis of a current occupancy grid $\mathcal{M}_t$ in order to determine an (actual) object assignment for the current time t. The individual (dynamic) objects 150 may each be described, for example, by a (rectangular) bounding box, or other geometric shape, and such a box representation is used without limitation of generality in the further description. Generally, a bounding box of an object 150 may be referred to as a boundary of the object 150. Example shapes of a boundary are a (rectangular) box, a box with rounded edges, an elliptical boundary, etc.

Based on the predicted object allocation of the cells 201, predicted bounding boxes (or boundaries) may be determined for the individual objects 150. Further, actual bounding boxes (or boundaries) for the individual objects 150 may be determined based on the actual object allocation.

Thus, to detect an object 150, contiguous dynamic cells 201 (which have a relatively high dynamic evidence mass) may be combined into a contiguous object 150 using a clustering algorithm. In the case of objects 150, which are arranged relatively close to each other, this may result in misassignments of individual cells 201 to the different objects 150. To increase the quality with which individual cells 201 are associated with different objects 150, the individual particles 300 may be associated with a particular object 150 as an additional attribute or label. In particular, a particle 300 may have an object attribute indicating whether or not the cell 201 in which the particle 300 is located when the particle 300 is initialized is associated with a (dynamic) object 150. Further, an object identifier may indicate the exact object 150 the cell 201 is associated with.

$\tau_{t-1}$ may reflect the set of dynamic objects 150 known at the time t−1 in the actual occupancy grid $\mathcal{M}_{t-1}$. Each particle 300 may have an object 150 $\tau \in \tau_{t-1}$ associated with it as an object attribute, or it may be indicated, as an object attribute, that the particle 300 is not associated with any object 150.

A particle 300 is associated with at most exactly one object 150 or no object 150. A particle 300 reinitialized at a particular time t may possibly not be associated with any object 150. Further, a particle 300 may retain its current object attribute or its current object assignment within the framework of the particle tracking process, particularly during the resampling step. Moreover, the process of filtering the particles 300 may remain unchanged, i.e., the distribution of the evidence mass of a cell 201 among existing particles 300 and among new particles 300 may be independent of the object association of the individual particles 300. This enables robust tracking of objects 150 at the particle level (without distortion from a model-based object level).

As set forth above, the particle tracking process may include a resampling step in which the actual D-evidence mass $m(D_{t-1})$ of a cell 201 is distributed among old and/or new particles 300. These particles 300 each have an object association as an object attribute. Based on the motion or motion hypothesis 301 of the individual particles 300, a position of the particles 300 at the (current) time t may then be predicted.

To determine whether a cell 201 belongs to a (dynamic) object 150, it may be determined at the time t, based on the predicted positions, which particles 300 fall into the cell 201, and what proportion of the particles 300 is assigned to the respective objects 150 $\tau \in \tau_{t-1}$. The cell 201 may then be assigned to one or possibly no object 150 based on the distribution of the object assignment of the particles 300. In particular, the cell 201 may be associated with the object 150$\tau \in \tau_{t-1}$ which has the relatively highest percentage of particles 300 in the cell 201. Possibly, this allocation may only be made if the relatively highest share reaches or exceeds a certain minimum threshold (e.g. of 50%, 60%, 70%, 80% or more). On the other hand, it is possible that it may be determined that the cell 201 is not part of an object 150 or that this cell 201 cannot be uniquely assigned to an object 150.

Thus, at a time t, based on the object attributes of the particles 300, the predicted position of which falls within a cell 201, it may be verified whether the cell 201 is part of an already known object 150 $\tau \in \tau_{t-1}$. Furthermore, to detect new objects 150, for those cells 201 that cannot be assigned to an object 150 (but that have a relatively high dynamic evidence mass), a clustering algorithm may be used to combine adjacent unassigned cells 201 into a coherent (new) object 150. Thus, the set $\tau_t$ of dynamic objects 150 may be updated.

Figure 5:
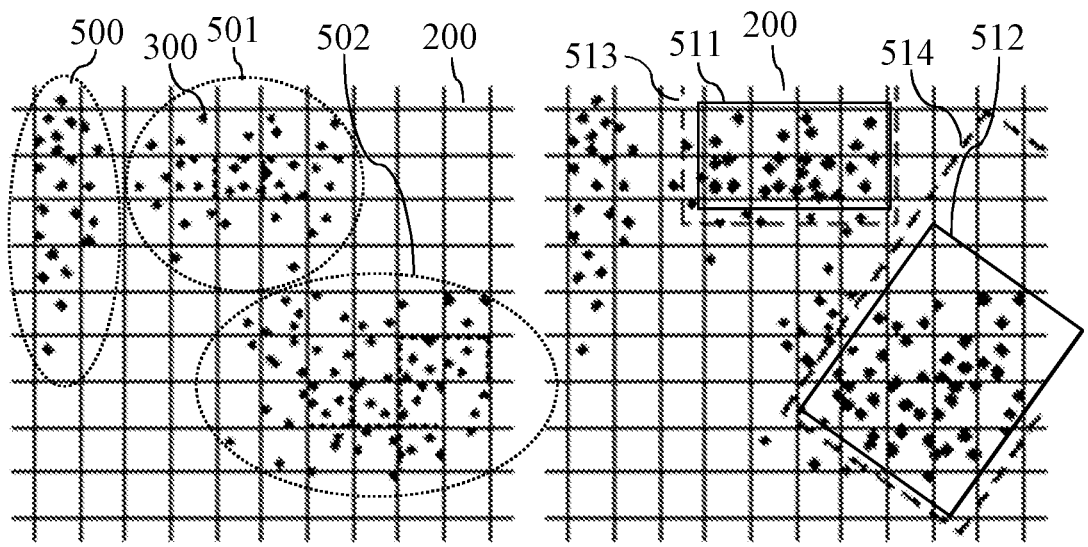
FIG. 5 shows exemplary particles in a grid for an environment of a vehicle.

After taking into account an actual measurement at time t, updated, actual, bounding boxes (and/or boundaries) for a given set $\tau_t$ of (dynamic) objects 150 may be provided. Based on these actual boxes (and/or boundaries) for the different objects 150, an update of the object attributes of the particles 300 may be performed. This is shown in FIG. 5 by way of example. FIG. 5 shows, on the left side, an occupancy grid 200 with a plurality of particles 300 (where the particles 300 are arranged at the respective predicted position). Further, FIG. 5, left side, illustrates object attributes of particles 300, wherein particles 300 in region 500 are not associated with a dynamic object 150, wherein particles 300 in region 501 are associated with a first dynamic object 150, and wherein particles 300 in region 502 are associated with a second dynamic object 150.

FIG. 5, right side, shows the actual bounding boxes (and/or boundaries) 511, 512 for the first and/or the second object 150, respectively, which were determined in the context of a (possibly model-based) object detection at the time t. Furthermore, FIG. 5, right side, shows enlarged tolerance areas 513, 514 around the actual bounding boxes (and/or boundaries) 511, 512. It may be checked whether a particle 300 is located outside an actual box (and/or boundary) 511, 512 and/or outside the tolerance range 513, 514. If so, this particle 300 may be assigned the object attribute indicating that the particle 300 is not part of a detected and/or extracted dynamic object 150. On the other hand, a particle 300 that lies within exactly one actual box (and/or boundary) 511, 512 may be assigned the affiliation with the corresponding object 150 as an object attribute (possibly only if the particle 300 has a movement 301 that lies within a tolerance range of the movement of the object 150).

In an overlap region of actual boxes (and/or boundaries) 511, 512 of different objects 150, typically no new assignment to an object 150 occurs. In this case, a newly initialized particle 300 is assigned an object attribute indicating that the particle 300 is not part of a dynamic object 150. In contrast, a particle 300 that already has an object attribute associated with an existing object 150 and continues to be within the tolerance range of the associated object 150 typically retains that association. Thus, the particle-object association existing from the previous time instant may be used to continue to enable a unique association of the cells 201 to the objects 150 even in the case of overlapping regions of multiple objects 150 occurring at the current time instant.

Thus, at time t, the object attributes of the individual particles 300 may be updated. In this regard, particles 300 located outside of the actual boxes (and/or boundaries) 511, 512 may lose an association with an object 150. On the other hand, particles 300 that are not associated with an object 150 and are uniquely located within a box (and/or boundary) 511, 512 may be associated with an object 150. Particles 300 that are already associated with an object 150 and remain within the tolerance range 513, 514 may retain this object attribute. The updated particles 300 may then be used for the subsequent time instant t+1 in the framework of the particle tracking process. The particles 300 may keep the respective updated object attribute.

Thus, one or more dynamic objects 150 may be detected at a time t. In this regard, each object $\tau$ 150 may have a particular object state $s_{\tau,t}$ at the time t:

$$s_{\tau,t} = [x_t^x, x_t^y, v_t, a_t, \varphi_t, \omega_t]^T$$

wherein $x=[x_t^x, x_t^y]$ indicates the 2D position of the object 150, wherein $v_t$ indicates the longitudinal velocity of the object 150, wherein $a_t$ indicates the corresponding longitudinal acceleration of the object 150, wherein $\varphi_t$ indicates the orientation and/or alignment of the object 150, and wherein $\omega_t = \dot{\varphi}_t$ indicates the rotation and/or yaw rate of the object 150 (relative to a reference point of the object 150, such as relative to the center of the rear axis of the object 150). Further, at the time instant t, the object 150 has an actual bounding box (and/or boundary) 511, 512 having a certain width w and a certain length l.

The goal is to determine the object state $s_{\tau,t}$ for an object 150 in a robust manner for a sequence of consecutive time instants t. This may be achieved by using a so-called Unscented Kalman Filter (UKF). A UKF includes the following steps:

a) Initialization of the object state $s_{\tau,t}$ when the object 150 is detected for the first time. In this regard, the individual state variables of the object state of the object 150 may be determined and/or initialized based on the particles 300 and/or the bounding box and/or boundary 511, 512 of a newly detected object 150.

b) Predicting the object state $\hat{s}_{\tau,t}$ based on the object state $s_{\tau,t-1}$ at a previous time t−1. This may be done using prediction equations for the individual state variables of the object state. In this case, the prediction is performed for 2·L+1 sigma points $\xi_{\tau,t-1}$, where L (in the present example L=6) is the number of state variables in the object state $s_{\tau,t-1}$. The 2·L+1 sigma points are selected in a specific environment of the determined object state $s_{\tau,t-1}$ (possibly using the covariance of the object state $s_{\tau,t-1}$). Thus, in the context of prediction, 2·L+1 predicted sigma points $\hat{\xi}_{\tau,t}$ are determined. Furthermore, weights $w_\xi$ may be determined for each of the individual sigma points $\xi_{\tau,t-1}$. The predicted object state $\hat{s}_{\tau,t}$ is then obtained as the weighted average of the predicted sigma points $\hat{\xi}_{\tau,t}$.

c) Performing a measurement update and/or innovation step using a current measurement $s_z$ of the object state. Here, the measurement error, i.e., the difference between the predicted object state $\hat{s}_{\tau,t}$ and the measured object state $s_z$, is used to correct, at least proportionally, the predicted object state $\hat{s}_{\tau,t}$ to determine the updated object state $s_{\tau,t}$.

The object state $s_{\tau,t-1}$ at a previous time t−1 may be used to predict the object state at a current time to determine a predicted object state $\hat{s}_{\tau,t}$. In the following, predicated variables are described with the hat "^". Further, the index x identifying a particular object 150 is at least partially suppressed for ease of writing. Prediction of the current object state $\hat{s}_{\tau,t}$ based on the actual previous object state $s_{\tau,t-1}$ may be performed using a motion model for an object 150. For example, in the motion model, it may be assumed that the object 150 has a constant rate of rotation and a constant longitudinal acceleration. The following prediction equations are then obtained $$\hat{\varphi}_t = \varphi_{t-1} + \omega \Delta t$$

$$\hat{v}_t = v_{t-1} + a \Delta t$$

$$\hat{x}_t^x = x_{t-1}^x + \frac{1}{\omega^2}(\omega \hat{v}_t \sin(\hat{\varphi}_t) + a \cos(\hat{\varphi}_t) - \omega v_{t-1} \sin(\varphi_{t-1}) - a \cos(\varphi_{t-1}))$$

$$\hat{x}_t^y = x_{t-1}^y + \frac{1}{\omega^2}(-\omega \hat{v}_t \cos(\hat{\varphi}_t) + a \sin(\hat{\varphi}_t) + \omega v_{t-1} \cos(\varphi_{t-1}) - a \sin(\varphi_{t-1}))$$

where Δt is the time duration between two directly consecutive time steps. Furthermore, in deviation from the basic assumption of a constant longitudinal acceleration and/or rotation rate, it may be assumed that the longitudinal acceleration and/or rotation rate converge relatively slowly towards zero. Thus, the robustness of the prediction may be increased. These prediction equations are then obtained:

$$\hat{\omega}_t = (1 - \varepsilon_\omega)\omega_{t-1}$$

$$\hat{a}_t = \arg\min_{a_1, a_2}(|a_1|, |a_2|), a_1 = (1 - \varepsilon_a)a_{t-1}, a_2 = \frac{-v_{t-1}}{t_{horizon}}$$

wherein the reduction factors $\varepsilon_\omega$ and $\varepsilon_a$ are greater than zero and less than one, respectively, and wherein sign changes of the longitudinal velocity may be avoided by the term $$\frac{-v_{t-1}}{t_{horizon}},$$

with $t_{horizon} \geq \Delta t$ (e.g., in the presence of a relatively strong deceleration of an object 150). In the above prediction equations, $\omega = \hat{\omega}_t$, as well as $a = \hat{a}_t$.

Furthermore, the prediction may take into account process noise, which may be described by a UKF matrix Q for process noise, wherein $$Q = \begin{bmatrix} Q_1 & 0 \\ 0 & Q_2 \end{bmatrix}$$

and $$Q_1 = \sigma_{w,a}^2 \begin{bmatrix} \frac{\Delta t^4}{4}\cos^2\varphi & \frac{\Delta t^4}{4}\sin\varphi\cos\varphi & \frac{\Delta t^3}{2}\cos\varphi & \frac{\Delta t^2}{2}\cos\varphi \\ \ldots & \frac{\Delta t^4}{4}\sin^2\varphi & \frac{\Delta t^2}{2}\sin\varphi & \frac{\Delta t^2}{2}\sin\varphi \\ \ldots & \ldots & \Delta t^2 & \Delta t \\ \ldots & \ldots & \ldots & 1 \end{bmatrix}$$

$$Q_2 = \sigma_{w,\dot\omega}^2 \begin{bmatrix} \frac{\Delta t^4}{4} & \frac{\Delta t^2}{2} \\ \frac{\Delta t^3}{2} & \Delta t^2 \end{bmatrix}$$

where $Q_1 = Q_1^T$ (the points in the above matrix thus represent the corresponding terms from the lines).

As discussed above, a subset of cells 201 belonging to a particular object 150 may be determined based on current measurements and using the occupancy grid 200. A current bounding box (and/or boundary) 511, 512 may be determined for these cells 201. In particular, based on a boundary 511, 512 of the object 150, the measured length $l_z$ and the measured width $w_z$ may be determined, these variables depending on the orientation φ of the boundary 511, 512. The measured length $l_z$ and the measured width $w_z$ may be determined as $$l_z = \max_{c \in C_{\tau,t}}(\tilde{x}_c^{\varphi,x}) - \min_{c \in C_{\tau,t}}(\tilde{x}_c^{\varphi,x}) + \delta_d^\varphi$$

$$w_z = \max_{c \in C_{\tau,t}}(\tilde{x}_c^{\varphi,y}) - \min_{c \in C_{\tau,t}}(\tilde{x}_c^{\varphi,y}) + \delta_d^\varphi$$

wherein the rotated cell positions $\tilde{x}_c^{\varphi,x}$ and $\tilde{x}_c^{\varphi,y}$, respectively, are derived from the cell positions $x_c^x$ and $x_c^y$, respectively, of the individual cells 201 of the object 150 by rotation $R_\varphi$ according to the orientation $\varphi$:

$$[\tilde{x}_c^{\varphi,x}, \tilde{x}_c^{\varphi,y}]^\top = R_\varphi \, [x_c^x, x_c^y]^\top$$

The operators "max" and "min" refer to the maximum and minimum position of the individual cells 201 in x and y direction, respectively. Thus, to determine the length $l_z$, the distance between the leading edge and the trailing edge of the boundary 511, 512 may be determined, and to determine the width $w_z$, the distance between the left edge and the right edge of the boundary 511, 512 may be determined. Furthermore, the cell size $d_c \times d_c$ of the individual cells 201 may be taken into account to determine the additional variable term $$\delta_d^\varphi = d_c(|\sin(\varphi)| + |\cos(\varphi)|) \in [d_c, \sqrt{2}\, d_c]$$

Figure 4:
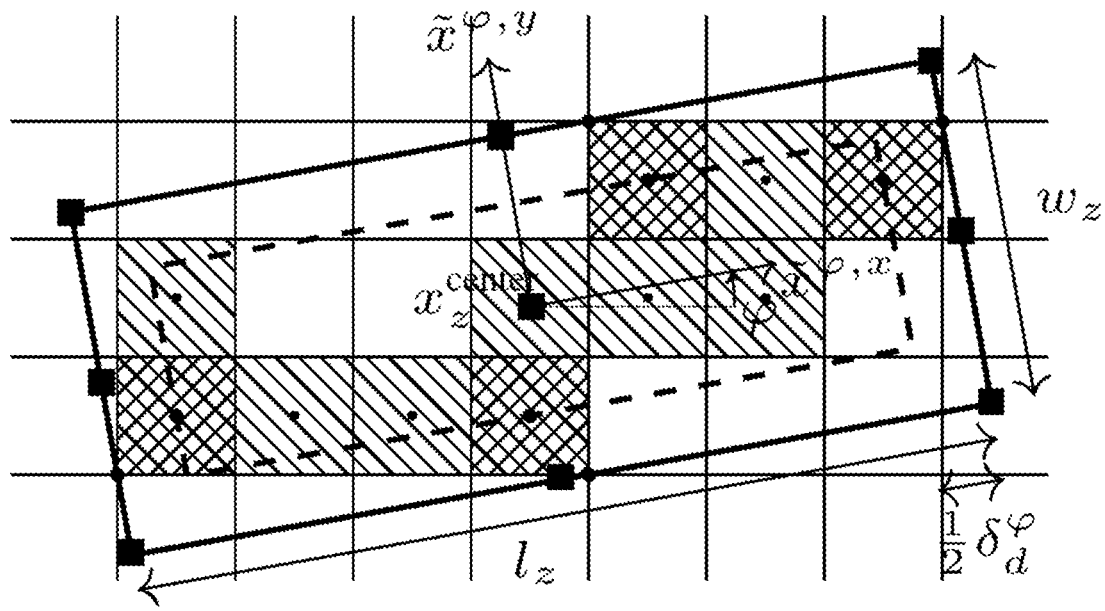
FIG. 4 shows an exemplary orientation of an object.

Thus, a current bounding box or boundary 511, 512 of an object 150 may be determined based on the current occupancy grid 200. The current box and/or boundary 511, 512 may then be used to determine the current position of the object 150. The current position of the object 150 may be, for example, the center of the current box and/or boundary 511, 512 or some other reference point of the current box and/or boundary 511, 512. The current position may be determined (as shown in FIG. 4) e.g. as $$x_z^{center} = R_\varphi^\top \begin{bmatrix} \min_{c \in C_{\tau,t}} (\tilde{x}_c^{\varphi,x}) + \frac{1}{2}(l_z - \delta_d^\varphi) \\ \min_{c \in C_{\tau,t}} (\tilde{x}_c^{\varphi,y}) + \frac{1}{2}(w_z - \delta_d^\varphi) \end{bmatrix}.$$

However, using the center point as a reference point is disadvantageous because the size of a bounding box 511, 512 may change due to maskings, which would result in a changed position of the object 150 (even when the object 150 is not moving). Preferably, therefore, a (trailing) corner or point (e.g., the center) of a (trailing) edge is used. The, the reference point is as follows $$x_z^{ref} = x_z^{center} + R_\varphi^\top \begin{bmatrix} \delta_{z,l}^{ref} l_z \\ \delta_{z,w}^{ref} w_z \end{bmatrix}, \delta_{z,l}^{ref}, \delta_{z,w}^{ref} \in \left\{0, \frac{1}{2}, -\frac{1}{2}\right\}$$

wherein the parameters $\delta_{z,l}^{ref}$, $\delta_{z,w}^{ref}$ may be selected for each object 150 (e.g., to select a reference point that provides a most robust position determination).

To select a suitable reference point for an object 150, the four edges of a box 511, 512 may be considered, and the proportion of free cells in a vicinity of each edge may be determined for each edge. A relatively high proportion of free cells indicates a relatively good visibility of the respective edge. If only one edge has a relatively high visibility, a midpoint on that edge may be chosen as the reference point. On the other hand, if two adjacent edges have relatively high visibility, the corner between these two edges may be chosen as the reference point.

The ratio $r_F(A)$ may be calculated in order to estimate the securability of an edge, with $$r_F(\mathcal{A}) = \frac{1}{|\mathcal{A}|} \sum_{c \in \mathcal{A}} m(F_{z,t}^c), \, \mathcal{A} \subseteq \mathcal{C}$$

where A is the set of cells in the immediate outer vicinity of an edge and where |A| is the number of cells in the set A. Thus, the ratio $r_F(A)$ indicates the average evidence mass per cell 201 for the hypothesis of a free cell 201 in the immediate vicinity of an edge. It may be assumed that the visibility $\vartheta_z^e$ of an edge e (where zero indicates low visibility and one indicates high visibility) may be approximated by the following value $$\vartheta_z^e \approx r_F(\mathcal{A}_e)$$

For the leading and/or trailing edge running in the transverse direction, the reference point may then be determined as $$\delta_{z,l}^{ref} = \begin{cases} +\frac{1}{2}, & \text{if } \vartheta_z^{front} \geq \vartheta_{min} \wedge \vartheta_z^{rear} < \vartheta_{min} \\ -\frac{1}{2}, & \text{if } \vartheta_z^{front} < \vartheta_{min} \wedge \vartheta_z^{rear} \geq \vartheta_{min} \\ 0, & \text{else} \end{cases}$$

and by corresponding formulas for the longitudinal left and right edges, respectively.

Based on the particles 300 associated with a cell 201 and based on the movement 301 (in particular the velocity) of the individual particles 300, the (directional) velocity of a cell 201 may be determined (as a weighted average of the directional velocities of the individual particles 300):

$$v_t^c = \left(\sum_{x \in \chi_t^c} o_\chi\right)^{-1} \cdot \sum_{x \in \chi_t^c} o_\chi v_\chi.$$

Here, $\chi_t^c$ is the amount of all particles 300 in a cell c 201 at time t, and $o_\chi$ indicates the dynamic evidence mass of the particle 300.

Based on the velocities of the cells 201 of an object 150, an average velocity of the object 150 may be determined, for example, as an average of the cell velocities weighted using the evidence masses of the individual cells 201:

$$\bar{v} = \left(\sum_{c \in C_{\tau,t}} m(D_{z,t}^c)\right)^{-1} \cdot \sum_{c \in C_{\tau,t}} m(D_{z,t}^c) v_t^c$$

From this directed velocity (i.e. from this 2D velocity vector), the magnitude of the velocity and the direction of movement are given as $$v_z = \|\bar{v}\|,$$

$$\varphi_z = \arctan(\bar{v}).$$

The uncertainties and/or variances may be determined as $$\sigma^2_{\varphi,z} = \eta_\sigma \sum_{c \in C_{\tau,t}} m(D^c_{z,t})(\|v^c_t\| - v_z)^2$$

$$\sigma^2_{\varphi,z} = \eta_\sigma \sum_{c \in C_{\tau,t}} m(D^c_{z,t})((\arctan(v^c_t) - \varphi_z)\mod 2\pi)^2$$

with the normalization factor $$\eta_\sigma = \frac{\sum_{c \in C_{\tau,t}} m(D^c_{z,t})}{\left(\sum_{c \in C_{\tau,t}} m(D^c_{z,t})\right)^2 - \sum_{c \in C_{\tau,t}} (m(D^c_{z,t}))^2}.$$

Thus, (pseudo) measurements of the longitudinal velocity $v_z$ and the orientation $\varphi_z$ may be determined. These (pseudo) measurements may be used to at least initialize the object state of a newly detected object 150.

Furthermore, based on the (pseudo) measurement of the orientation $\varphi_z$ a confidence interval for the orientation $\varphi$ may be defined. The confidence interval for the orientation $\varphi$ may be used to constrain a measured value (determined elsewhere) of the orientation $\varphi$ to avoid convergence of the orientation $\varphi$ to a false local minimum. The convergence interval may be defined as $$I^\chi_\varphi = \{\varphi \in [-\pi, \pi] \mid |\varphi - \varphi_z|\mod \pi \leq \gamma \sigma_{\varphi,z} + \sigma^\chi_{\varphi,min}\}$$

where $\gamma$ is a scaling factor, and where $\sigma_{\varphi,min}^\chi$ defines an additional uncertainty.

Using the particles 300 to determine a current measurement of the object velocity $v_z$ and object orientation $\varphi_z$ may result in a time delay, as the iterative update of the particles 300 corresponds to filtering, which typically results in a time delay. Therefore, methods are described below to determine the object velocity $v_z$ and the object orientation $\varphi_z$ without filtering and without time delay.

An area $A_i^\varphi$ that includes all cells 201 enclosed by the box 511, 512 having a length $l_z$ and a width $w_z$, may be defined for a particular orientation $\varphi$ of the bounding box 511, 512 of an object 150. For this area, the average evidence mass for the hypothesis of an unproven cell may be determined, i.e. $r_F(A_i^\varphi)$. To determine the current measured object orientation $\varphi_z$ the following optimization problem may then be solved $$\varphi^*_z = \underset{\varphi \in I^\chi_\varphi}{\arg\min}\ \kappa(\varphi),\ \kappa(\varphi) = r_F(A_i^\varphi)$$

to determine the orientation $\varphi$ for which the proportion of unoccupied cells and/or unoccupied evidence mass is minimal. To solve this optimization problem, values for the occupancy measure $r_F(A_i^\varphi)$ for different orientations $$\varphi_i = \varphi_0 + i \cdot \delta_\varphi \in I^\chi_\varphi \text{ and } i \in \mathbb{Z}$$

may be gradually determined. In this regard, the orientation $\varphi_z$ determined on the basis of the particles 300 may be used as a starting point $\varphi_0$. The bounding box 511, 512 may thus be oriented in different ways to determine different areas $A_i^\varphi$ (i.e., different subsets of cells 201). A value of the occupancy measure $r_F(A_i^\varphi)$ may then be determined for each of the different areas $A_i^\varphi$. If for a certain orientation $\varphi_{i^*}$ a minimum value for $r_F(A_i^\varphi)$ results, then the current measurement value $\varphi_z^*$ for the object orientation may be determined as $$\varphi^*_z \approx \left(\sum_{\varphi'} \frac{1}{\kappa(\varphi')}\right)^{-1} \cdot \sum_{\varphi'} \frac{1}{\kappa(\varphi')} \cdot \varphi',$$

$$\varphi' \in \{\varphi_{i^*}, \varphi_{i^*} + \delta_\varphi, \varphi_{i^*} - \delta_\varphi\}.$$

with the variance and/or uncertainty $$\sigma^2_{\varphi,z} = (\nabla_r - \nabla_l)^{-2}$$

with the right and left side gradients, e.g. determined by means of $$\nabla_r = \frac{\kappa(\varphi^{max,r}_i) - \kappa(\varphi_{i^*})}{\varphi^{max,r}_i - \varphi_{i^*}},\ \varphi^{max,r}_i = \max_{i > i^*} \varphi_i.$$

(and for the left-hand gradient in the corresponding way).

Thus, a measured value $\varphi_{z^*}$ for object orientation may be determined in an efficient and robust manner. The current object orientation measurement value $\varphi_z^*$ may be used (as explained above) to determine a current measurement value $x_z^{ref}$ for the position (of the reference point) of the object 150.

A vehicle 100 may include one or more radar sensors as environmental sensors 111. Sensor data from a radar sensor 111 may be considered within the scope of the occupancy grid 200. In particular, velocity measurement values $z_{v,t}^c$ may be displayed for the individual (occupied) cells 201, wherein a velocity measurement value $z_{v,t}^c$ may, in particular, indicate

- the radial velocity $v_z^r$ of the cell 201 (in the radial direction relative to the position $x_s$ of the radar sensor 111;
- the position $x_s$ of the radar sensor 111; and/or
- the azimuth angle $\theta_z^r$ of the cell 201 relative to the position $x_s$ of the radar sensor 111.

Figure 6:
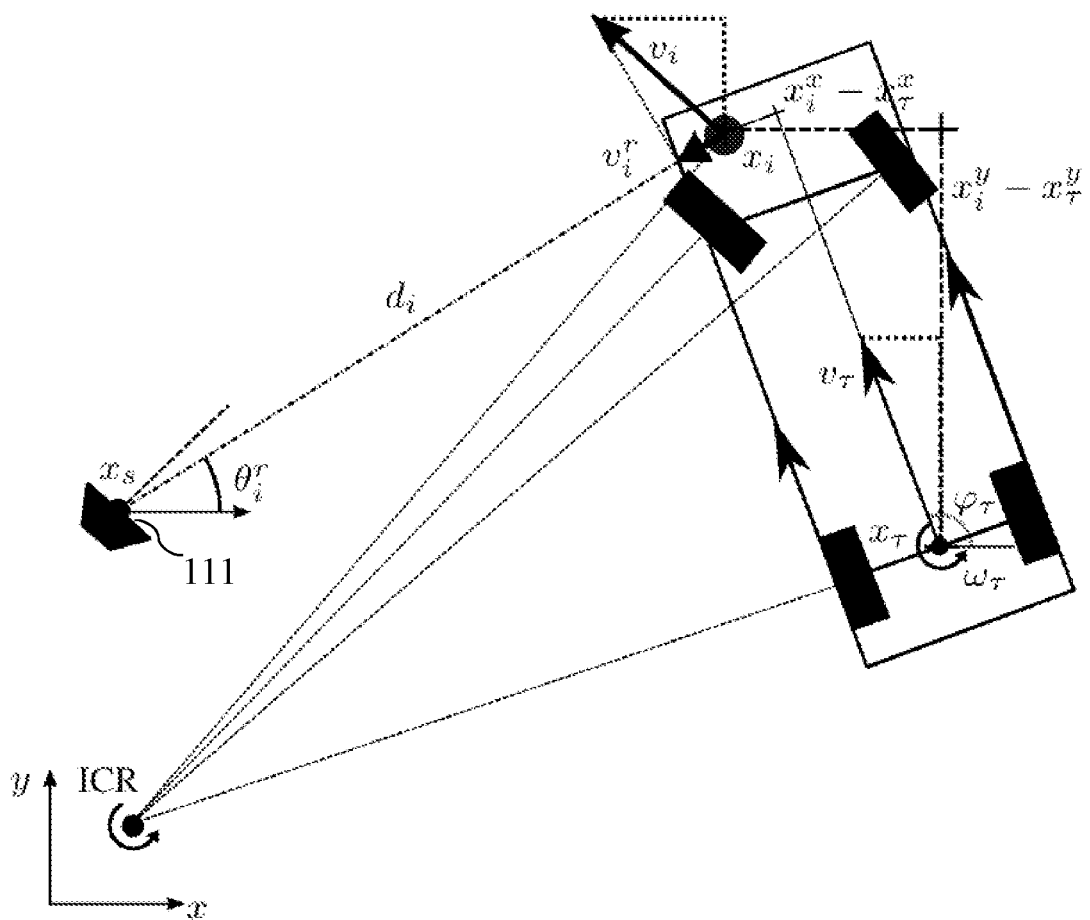
FIG. 6 shows an exemplary geometric relationship between a radar sensor and a detected object.

The velocity $v_\tau$ of an object 150 may be viewed as a scalar velocity in the longitudinal direction of a (velocity) reference point (e.g., the center of the rear axle) of the object 150 (see FIG. 6). Also, the orientation $\varphi_\tau$ and the rotation rate $\omega_\tau$ of the object 150 may be specified with respect to this (velocity) reference point. The (velocity) reference point may be different from the above-described reference point for determining the position of an object 150.

The 2D velocity vi at any point $x_i$ of the object 150 may be determined as $$\begin{bmatrix} v^x_i \\ v^y_i \end{bmatrix} = v_\tau \begin{bmatrix} \cos(\varphi_\tau) \\ \sin(\varphi_\tau) \end{bmatrix} + \omega_\tau \begin{bmatrix} -(x^y_i - x^y_\tau) \\ x^x_i - x^x_\tau \end{bmatrix}$$

wherein the instant center of rotation (ICR) of the object 150 was considered with an Ackermann steering geometry and drift-free operation of the object 150.

The radial velocity $v_i^r$ at the point $x_i$ is then as follows $$v_i^r = [\cos(\theta_i^r), \sin(\theta_i^r)]\begin{bmatrix} v_i^x \\ v_i^y \end{bmatrix}$$
$$= v_\tau(\cos(\theta_i^r)\cos(\varphi_\tau) + \sin(\theta_i^r)\sin(\varphi_\tau)) +$$
$$\omega_\tau[\cos(\theta_i^r), \sin(\theta_i^r)]\begin{bmatrix} -(x_i^y - x_\tau^y) \\ x_i^x - x_\tau^x \end{bmatrix}$$

However, when using a discrete occupancy grid 200 with a discretized position $x_i$ of a cell 201, e.g. the cell center point, this calculation method typically leads to a distortion as it does not include the exact continuous position of the (radar) detection. Such distortion may be avoided by taking into account the exact sensor position $x_s$ of the measuring sensor 111. To derive an alternative calculation method, the position of a (radar) detection may therefore be described as $$\begin{bmatrix} x_i^x \\ x_i^y \end{bmatrix} = d_i \begin{bmatrix} \cos(\theta_i^r) \\ \sin(\theta_i^r) \end{bmatrix} + \begin{bmatrix} x_s^x \\ x_s^y \end{bmatrix}$$

wherein $d_i = \|x_i - x_s\|$ indicates the distance between the position $x_s$ of the radar sensor 111 and the considered position $x_i$ of the object 150 (and/or a cell 201 of the object 150) and/or the position of the original measurement. Taking into account the relation $$[\cos(\theta_i^r), \sin(\theta_i^r)]\begin{bmatrix} -x_i^x \\ x_i^y \end{bmatrix} = [\cos(\theta_i^r), \sin(\theta_i^r)]\begin{bmatrix} -x_s^x \\ x_s^y \end{bmatrix}$$

the following results in a precise manner for the radial velocity $$v_i^r = v_\tau\cos(\theta_i^r - \varphi_\tau) + \omega_\tau(\sin(\theta_i^r)(x_s^x - x_\tau^x) - \cos(\theta_i^r)(x_s^y - x_\tau^y))$$

without dependence on the possibly distorting position of the discretized cell. This relationship between the longitudinal velocity $v_\tau$ of an object 150 and/or a cell 201 of an object 150 and the radial velocity $v_i^r$ of the cell 201 of the object 150 may be used to determine, in a precise manner, a predicted or expected value of the radial velocity based on a predicted value of the longitudinal velocity.

In the prediction step, a plurality of predicted sigma points $\hat{\xi}_{\tau,t}$ are determined to determine the predicted object state $\hat{s}_{\tau,t}$. Each predicted sigma point $\hat{\xi}_{\tau,t}$ shows a certain predicted value for the individual state variables. In particular, a predicated sigma point $\hat{\xi}_{\tau,t}$ may include
- a predicted value $\hat{v}_{\tau,t,\xi}$ of the longitudinal velocity of the object 150;
- a predicted value $\hat{x}_{\tau,t,\xi}^x$ of the x-component of the position of the object 150;
- a predicted value $\hat{x}_{\tau,t,\xi}^y$ of the y-component of the position of the object 150;
- a predicted value $\hat{\varphi}_{\tau,t,\xi}$ of the orientation of the object 150; and/or
- a predicted value $\hat{\omega}_{\tau,t,\xi}$ of the rotation rate of the object 150.

By means of the above-mentioned formula for the radial velocity, the corresponding predicted and/or expected value $h_i^r(\hat{\xi}_{\tau,t})$ of the radial velocity for this sigma point $\hat{\xi}_{\tau,t}$ may thus be determined based on the predicted and/or expected values of a predicted sigma point $\hat{\xi}_{\tau,t}$, namely as $$h_i^r(\hat{\xi}_{\tau,t}) =$$
$$\hat{v}_{\tau,t,\xi}\cos(\theta_{z,i}^r - \hat{\varphi}_{\tau,t,\xi}) + \hat{\omega}_{\tau,t,\xi}(\sin(\theta_{z,i}^r)(x_{s,i}^x - \hat{x}_{\tau,t,\xi}^x) - \cos(\theta_{z,i}^r)(x_{s,i}^y - \hat{x}_{\tau,t,\xi}^y))$$

The predicted and/or expected value $\hat{v}_i^r$ of the radial velocity is then obtained as the weighted average of the predicted values $h_i^r(\hat{\xi}_{\tau,t})$ of the radial velocity determined for the individual predicted sigma points $\hat{\xi}_{\tau,t}$, namely as $$\hat{v}_i^r = \sum_{\xi \in \Xi} w_\xi h_i^r(\hat{\xi}_{\tau,t})$$

where $\Xi$ is the set of all sigma points $\xi$, and where $w_\xi$ are the weights of the different sigma points $\xi$.

The innovation step of the UKF may be done using radial velocity (instead of longitudinal velocity). In particular, the deviation between the predicted or expected value $\hat{v}_i^r$ of radial velocity for a cell 201 or for an object 150 and the measured value $v_{z,i}^r$ of radial velocity, i.e. $v_{z,i}^r - \hat{v}_i^r$ may be used as an error or innovation or measurement update. In an efficient manner, the measured velocity may thus be taken into account in determining the object state $s_{\tau,t}$ of an object 150, wherein a measurement update of the (radial) velocity components may have an effect on all components of the object state, whereby, in addition to the longitudinal velocity, the orientation and/or the rotation rate of an object in particular may be estimated.

This method may also be applied equivalently to other velocity-measuring sensors. For example, a lidar sensor may be used to measure a radial velocity, if applicable. Alternatively or additionally, the angular velocity of an object 150 may be measured based on data from camera sensors. In this case, a corresponding formula for the tangential velocity may be provided.

Figure 7A:
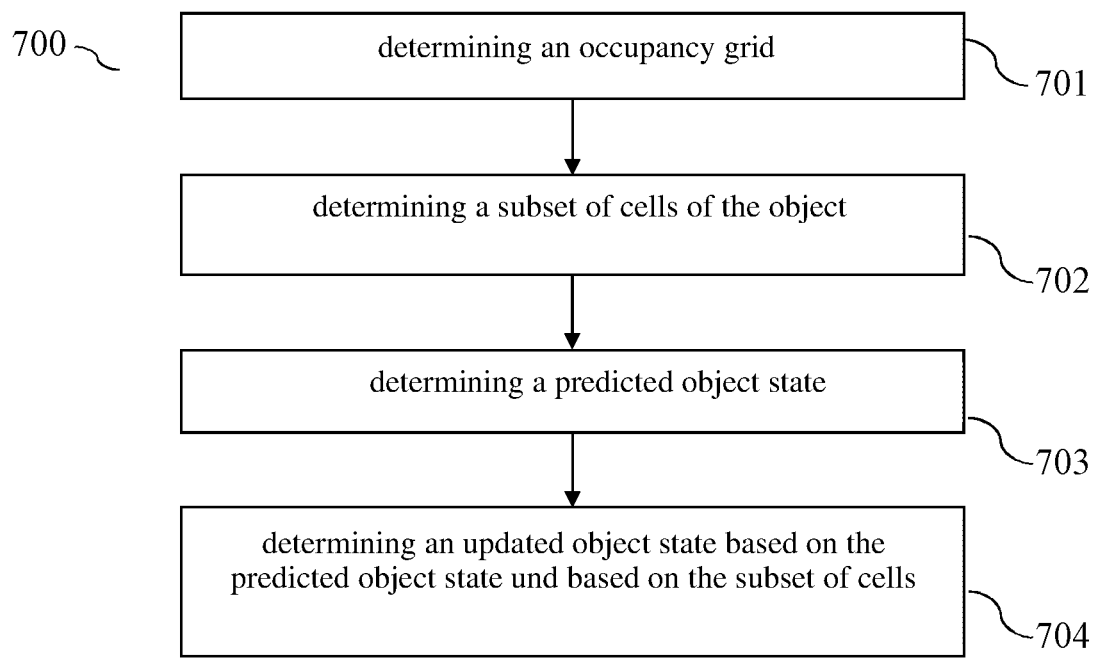
FIG. 7a shows a flow chart of an exemplary method for determining the object state of an object.

FIG. 7a illustrates a flowchart of an exemplary method 700 for determining an object state of an object 150 at a sequence of time instants. The method 700 may be carried out by an evaluation unit 101 of a vehicle 100. The object state to be determined may include values for one or more state variables, where the one or more state variables may include a position in a spatial area, an orientation, and/or a velocity of the object 150. The spatial area may include a plurality of cells 201.

The method 700 comprises, in an iterative manner for one time instant t at a time from the sequence of time instants, the determining 701, based on sensor data from one or more sensors 111 with respect to the spatial area, of an occupancy grid 200. The occupancy grid 200 may be determined as described herein. For each of the plurality of cells 201 the occupancy grid 200 may indicate an evidence or evidence mass or probability that the respective cell 201 is vacant or occupied by the object 150 at the time t. The occupancy grid 200 may be iteratively updated for the sequence of time instants each based on a current measurement of the sensor data. In particular, as described in this document, an actual occupancy grid $\mathcal{M}$ 200 may be determined.

Further, the method 700 comprises determining 702, based on the occupancy grid 200, a subset of one or more cells 201 from the plurality of cells 201 belonging to the object 150 at the time t. This may be done, for example (as described in connection with FIG. 5), using a clustering algorithm. Further, particles 300 may be considered when assigning cells 201 to object 150.

Further, the method 700 may include determining 703 a predicted object state of the object 150 for the time instant t based on the object state for a previous time instant t−1. For this purpose, one or more of the prediction equations described in this document may be used.

Further, the method 700 may include determining 704 the object state for or at the time t based on the predicted object state for the time t and based on the determined subset of one or more cells 201 of the object 150. In particular, the subset of cells 201 of the object 150 determined for or at the time t based on a current measurement of the sensor data may be used to provide a measurement update or innovation to update the object state for the previous time t−1. In particular, as described herein, measured values for the position of the object 150, for the orientation of the object 150, and/or for the (radial) velocity of the object 150 may be determined based on the determined subset of cells 201 of the object 150. Thus, the object state of an object 150 may be determined in a reliable and robust manner for a sequence of successive points in time.

In the following, one or more measures are described by which the size of an object 150 (in particular the length and/or the width of an object 150) may be determined in a precise manner.

The length $l_\tau$ and/or the width $w_\tau$ of an object 150 typically cannot be determined in a precise manner with a single measurement at a given point in time t. Rather, based on one or more measurements, typically only a lower limit of length $l_\tau$ and/or width $w_\tau$ may be determined. The fact whether a measurement also corresponds to the upper limit (and thus the actual value) of the length $l_\tau$ and/or the width $w_\tau$ depends on the visibility of the individual edges e of the bounding box 511, 512 of the object 150.

The visibility $\vartheta_z^e$ of an edge e of the bounding box 511, 512 at a particular measurement may be defined as a value between zero and one, wherein zero indicates no visibility and one indicates full visibility. As shown above, the securability of an edge may be determined based on the clearance in the immediate vicinity of the edge, namely as $$\vartheta_z^e \approx r_F(\mathcal{A}_e)$$

Within the scope of a measurement (i.e. at a specific point in time t), the following measurement vectors may thus be provided $$z_t^{l,\vartheta} = [l_z, \vartheta_z^{front}, \vartheta_z^{rear}]^\top,$$
$$z_t^{w,\vartheta} = [w_z, \vartheta_z^{left}, \vartheta_z^{right}]^\top.$$

In this case, a measurement vector may have a current measurement value $l_z$, $w_z$ of the length or the width, which results, for example, from the distance between the leading edge and the trailing edge (for the length) or between the left edge and the right edge (for the width). Furthermore, the measurement vectors may display the visibility $\vartheta_z^e$ of each relevant edge (i.e. $\vartheta_z^{front}$ for the leading edge, $\vartheta_z^{rear}$ for the trailing edge, $\vartheta_z^{left}$ for the left edge, and $\vartheta_z^{right}$ for the right edge).

The goal is to determine the length $l_\tau$ and the width $w_\tau$ of an object 150 based on all available measurements up to the current time t, i.e., all measurements from 1:t. In particular, a probability distribution for the length $l_\tau$ and the width $w_\tau$ of an object 150 is to be determined, as $$p(l_\tau, w_\tau \mid z_{1:t}^{l,\vartheta}, z_{1:t}^{w,\vartheta}) = p(l_\tau \mid z_{1:t}^{l,\vartheta}) p(w_\tau \mid z_{1:t}^{w,\vartheta})$$

It may be assumed that the length $l_\tau$ and the width $w_\tau$ are independent of each other and may therefore be determined independently of each other. The determination of the length is described below, wherein the determination of the width may be carried out analogously. The following model for the length $l_\tau$ may be assumed as an inverse sensor model $$p(l \mid z_t^{l,\vartheta}) \propto \exp\left(-\frac{(l - l_z)^2}{2\varsigma_{l,\vartheta}\sigma_l^2}\right),$$

$$\varsigma_{l,\vartheta} = \begin{cases} (\vartheta_z^{front}\vartheta_z^{rear})^{-1}, & \text{if } l \geq l_z \\ 1 & \text{else} \end{cases}$$

Figure 8:
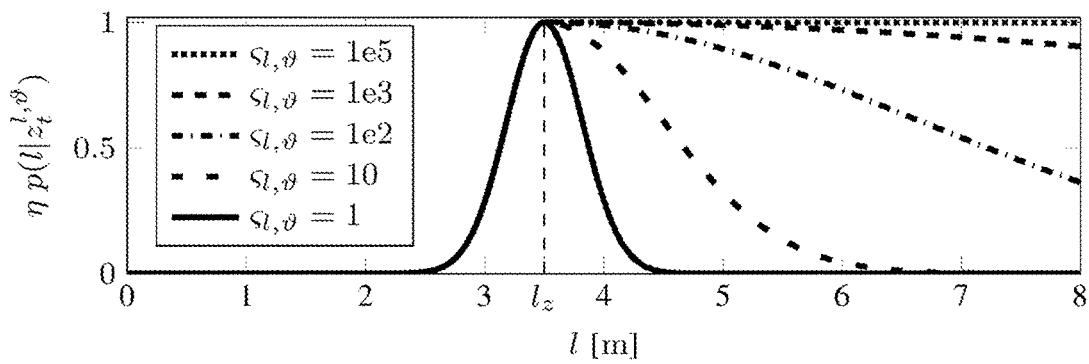
FIG. 8 shows exemplary measurement probability distributions for different values of the visibility of an edge.

The scaling variable $\varsigma_{l,\vartheta}$ may be used to take into account the influence of the visibility $\vartheta_z^e$ of an edge e. FIG. 8 shows the measurement probability distribution $p(l|z_t^{l,\vartheta})$ for different values of the scaling variable $\varsigma_{l,\vartheta}$.

The scaling variable $\varsigma_{l,\vartheta}$ depends on the visibility of the leading edge ("front") and trailing edge ("rear") relevant for the determination of the length $l_\tau$. The scaling variable $\varsigma_{l,\vartheta}$ thus represents a (possibly inverse) measure of the quality with which the length $l_\tau$ of an object 150 may be measured. If both edges are clearly visible, the upper limit of the length $l_\tau$ may be determined in a precise way, so that $\varsigma_{l,\vartheta} \approx 1$ and so that a normal distribution for the measurement probability distribution $p(l|z_t^{l,\vartheta})$ of the length is obtained. However, if at least one of the two edges is not visible or only slightly visible, the tendency is $\varsigma_{l,\vartheta} \to \infty$ and a section-wise function results as the measured probability distribution $p(l|z_t^{l,\vartheta})$ of the length, which still corresponds to a normal distribution below the measured length $l_z$, but is approximately uniformly distributed above this measured length $l_z$, thus overall approximately representing a sigmoid function.

To determine the length $l_z$ based on all available measurements up to the current point in time t, i.e. for all time instants 1:t, a one-dimensional (1D) histogram filter may be used. For this purpose, the continuous measurement probability distribution $p(l|z_t^{l,\vartheta})$ of the length for a certain number $l_i$ of different length intervals may be discretized with the respective mean lengths $l_1, \ldots, l_{l_i}$, wherein the distance between two mean lengths $l_i$ and $l_{i+1}$ is defined by the interval width $\delta_i$. The probability distribution in a length interval may then be approximated by the following probability value $$p(l_\tau \mid z_{1:t}^{l,\vartheta}) \approx \frac{p_{l_\tau,t}^i}{\delta^i}, l_\tau \in \left(l_i - \frac{\delta_i}{2}, l_i + \frac{\delta_i}{2}\right]$$

The (cumulative) probability for a length interval i may then be determined recursively as follows:

$$p_{l_\tau,t}^i = \frac{p(l_i \mid z_t^{l,\vartheta}) p_{l_\tau,t-1}^i}{\sum_{j=1}^{I_l} p(l_j \mid z_t^{l,\vartheta}) p_{l_\tau,t-1}^i}$$

wherein the (cumulative) probabilities $p_{l_\tau,0}^i$ for the different length intervals i at the time t=0 may be initialized according to a uniform and/or even distribution, with $$p_{l_\tau,0}^i = \frac{1}{I_l},$$

$\forall i$. In order to avoid singularities and to ensure reliable convergence, a condition may be set in each iteration that the individual probability values $p_{l_\tau,t-1}^i$ do not fall below a certain minimum value $\epsilon_{min} > 0$.

The filtering at a time t may be done in such a way that the visibility $\vartheta_z^e$ of the edges relevant for the length, and based on that the value of the scaling variable $\zeta_{l,\vartheta}$, is determined. The result is then a measurement probability distribution $p(l|z_t^{l,\vartheta})$ of the length for the current measurement. Based on the individual (cumulative) probability values $p_{l_\tau,t-1}^i$ for the previous time t−1, the updated cumulative probability values $p_{l_\tau,t}^i$ for the current time t may then be determined (using the above recursive formula). The cumulative or filtered probability distribution $p(l_\tau|z_{1:t}^{l,\vartheta})$ is then obtained in an approximated manner, based on the probability values $p_{l_\tau,t}^i$, using the above formula.

By using a recursive histogram filter, the length and, in a corresponding manner, the width of the bounding box 511, 512 of an object 150 may be determined in an efficient and robust manner and updated with each new measurement. The length $l_\tau$ of an object 150 (and correspondingly the width $w_\tau$ of an object 150) may then be determined as the expected value of the cumulative probability distribution $p(l_\tau|z_{1:t}^{l,\vartheta})$. The determined length and/or width may then be taken into account when updating the object state of the object 150, as described above.

Furthermore, the determined length and/or width of the bounding box 511, 512 of an object 150 may be taken into account when classifying an object 150. Example classes include: a car, a truck, a pedestrian, a bicyclist, a motorcyclist, and/or another type of road user. Thus, a set K of different classes of road users may be provided, and it may be determined which class $k \in K$ an object 150 belongs to based on the length l and/or the width w of the bounding box 511, 512 of an object 150. The velocity v of the object 150 (indicated by the object state) may also be taken into account. This results in the estimation problem $$p(k \mid l, w, v) = \frac{p(k) p(l, w, v \mid k)}{p(l, w, v)}.$$

This problem may be reformulated under the assumption of conditional independence from l, w, v as $$p(k \mid l, w, v) \propto p(k) p(l \mid k) p(w \mid k) p(v \mid k).$$

Figure 9:
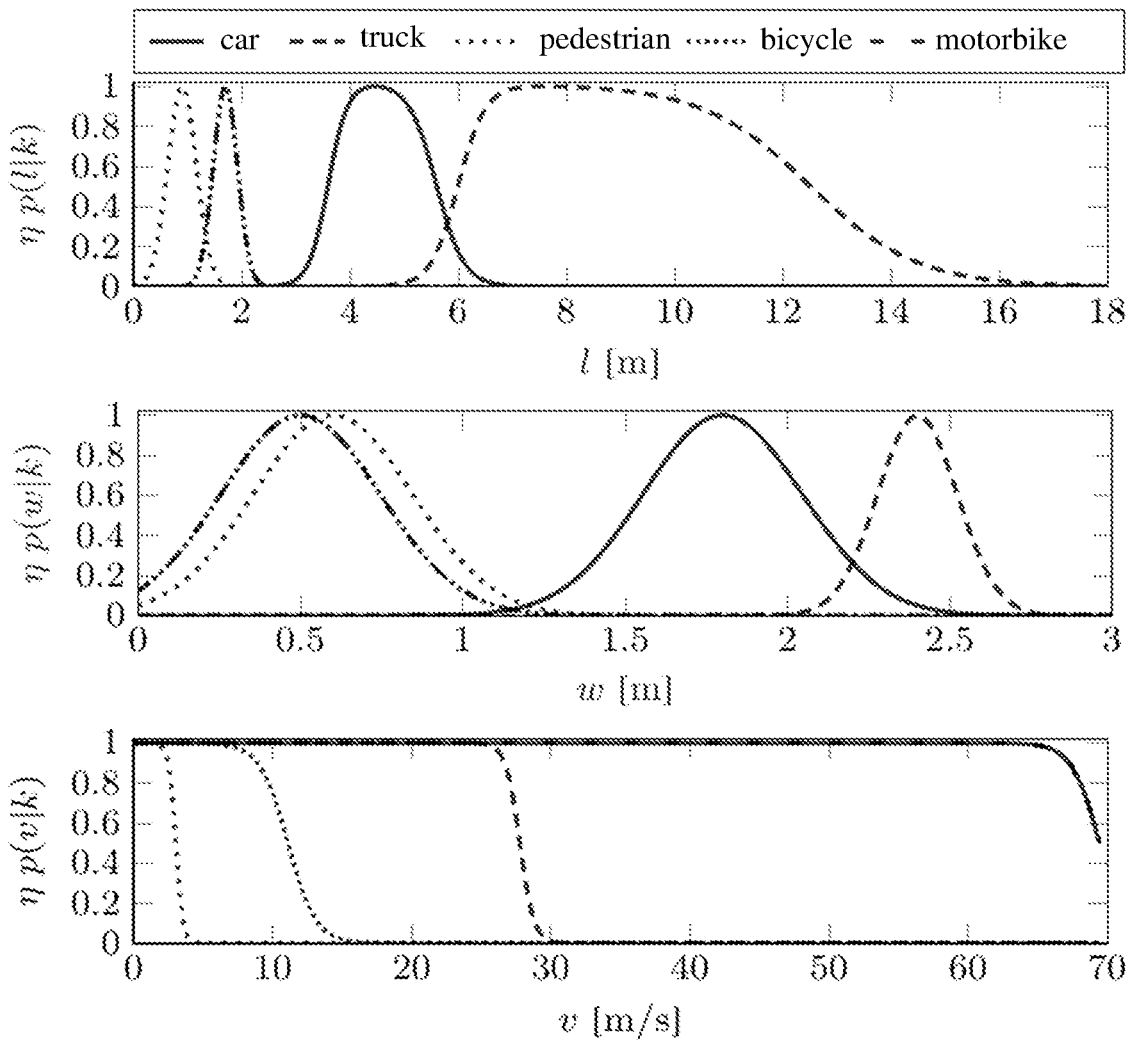
FIG. 9 shows exemplary class probability distributions for the length, the width and the velocity of different object classes.

FIG. 9 shows exemplary class probability functions p(l|k), p(w|k) and p(v|k) for different classes. For the class "other road users" a uniform distribution for l, w, v may be assumed. The class probability functions p(l|k), p(w|k) and p(v|k) for different classes may be determined experimentally. Alternatively or complementarily, analytical approximations for the class likelihood functions p(l|k), p(w|k) and p(v|k) may be provided. For a pedestrian, a cyclist and a motorcyclist, a normal distribution may be assumed for the length and/or the width respectively. Furthermore, normal distributions may be assumed for the width of a car and/or a truck. On the other hand, for a truck and/or for a car, a combination of two sigmoid functions (one for the minimum possible length $l_{min}^k$ and one for the maximum possible length $l_{max}^k$) may be assumed due to the relatively large differences in possible lengths:

$$p(l \mid k) \propto S(l, l_{min}^k, \alpha_{l,min}^k)(1 - S(l, l_{max}^k, \alpha_{l,max}^k))$$

e.g. with each $$S(x, x_0, \alpha) = \frac{1}{1 + e^{-\alpha(x-x_0)}}.$$

Furthermore, a probability distribution in the form of a negative sigmoid function may be assumed for the speed of each of the different classes:

$$p(v \mid k) \propto 1 - S(v, v_{max}^k, \alpha_v^k).$$

The class probability function drops abruptly for speeds above the maximum speed $v_{max}^k$ of the respective class, so that the speed of a class may be used as an exclusion criterion.

The best class k* given knowledge of values for the length, the width, and the velocity may be identified by the following optimization problem:

$$k^* = \underset{k \in K}{\arg\max} \, p(k \mid l, w, v)$$
$$= \underset{k \in K}{\arg\max} \, p(k) p(l \mid k) p(w \mid k) p(v \mid k).$$

Classification may be carried out based on any single measurement of length, width and/or velocity (i.e. at any point in time t). Filtering of the class determined at the individual time instants t for an object 150 may then be performed to enable a robust classification of an object 150 over time.

Alternatively, the classification may be determined based on the cumulative probability distributions $p(l_\tau|z_{1:t}^{l,\vartheta})$ for the length and/or for the width, which are determined as part of the histogram filtering described above. In particular, at a point in time t (cumulative) probability values $p_{l_\tau,t}^i$ may be determined for the different length intervals i=1, . . . , $I_l$. In a corresponding manner, (cumulative) probability values $p_{w,t}^i$ for the different width intervals i=1, . . . , $I_w$ may be determined.

At a point in time t the expected value of the length $$E_L[p(L_\tau \mid k)] = \sum_{i=1}^{l_l} p(l_i \mid k) p^i_{l_{\tau,t}}$$

and the expected value $E[p(W_\tau|k)]$ of the width may be determined in a corresponding manner. For the velocity of an object 150, the maximum velocity observed up to the current time t, i.e., between points in time 1:t, may be considered (as an exclusion criterion for a class) as:

$$v_\tau^{max} = \max_{t'=1,\ldots,t} (v_{\tau,t'}).$$

The class $k_\tau^*$ of the object 150 may then be calculated based on the filtered length and/or width by the following optimization problem:

$$k_\tau^* = \underset{k \in \mathcal{K}}{\arg\max} E_{L,W}[p(k \mid L_\tau, W_\tau, v_\tau^{max})]$$

$$= \underset{k \in \mathcal{K}}{\arg\max} p(k) p(v_\tau^{max} \mid k) E_{L,W}[p(L_\tau \mid k) p(W_\tau \mid k)]$$

$$= \underset{k \in \mathcal{K}}{\arg\max} \left( p(k) p(v_\tau^{max} \mid k) \sum_{i=1}^{l_l} p(l_i \mid k) p^i_{l_{\tau,t}} \sum_{i=1}^{l_w} p(w_i \mid k) p^i_{w_{\tau,t}} \right).$$

Thus, the class $k_\tau^*$ for an object 150 may be determined, for which the product of
 the a priori probability p(k) of a class,
 the likelihood probability $p(v_\tau^{max}|k)$ that an object 150 of this class has the velocity $v_\tau^{max}$, and
 the expected value of the likelihood probability for the length and/or width of the object 150 given this class
is increased, in particular maximized, i.e. has the highest a posteriori probability p(k|l,w,v). This classification concept may be arbitrarily combined with other features of the object 150 (determined, for example, based on image data from a camera) to further increase the classification quality.

The class $k_\tau^*$ determined for an object 150 may be used to determine the most likely length of the object 150 (particularly when only the minimum length of the object 150 may be measured based on sensor data from the one or more sensors 111), and/or to determine the most likely width of the object 150 (particularly when only the minimum width of the object 150 may be measured based on sensor data from the one or more sensors 111). In particular, the most likely length (and/or width) that the object 150 has may be determined, assuming that the object 150 is an object of the class $k_\tau^*$.

From the measurements (in particular from the determined actual occupancy grid 200), the probability values $p_{l_{\tau,t}}^i$ for the different length intervals i=1, ..., $I_l$ are obtained at a certain point in time t. Furthermore, the expected or likelihood probabilities $p(l_i|k_\tau^*)$ are obtained for the length of object 150, assuming that object 150 belongs to class $k_\tau^*$. Consequently, combined probabilities for the different length intervals i=1, ..., $I_l$ result $$p_{comb}^{i,l} \propto p(l_i \mid k_\tau^*) \cdot p^i_{l_{\tau,t}}$$

It is now possible to determine the length interval $i_{l_\tau}^*$ that has the highest combined probability $$i_{l_\tau}^* = \underset{i=1,\ldots,J_l}{\arg\max} \left\{ p_{comb}^{i,l} : p_{comb}^{i,l} > \left( (1+\epsilon) \max_{j=1,\ldots,i} p_{comb}^{j,l} \right) \right\}$$

wherein, as a constraint, it may be specified that longer lengths are only selected if the combined probability for this length is significant (i.e. higher than the previous maximum of a lower length by at least a factor (1+ϵ)). The selection of a length interval $i_{l_\tau}^*$ may thus be made in such a way that, if there are several length intervals with similar combined probabilities, the smallest length interval is selected. The (average) length $$l_{i_{l_\tau}^*}$$

of the determined length interval $i_{l_\tau}^*$ may then be selected as the length $l_\tau^*$ of the object 150. In a corresponding manner, the width $w_\tau^*$ of the object 150 may also be determined taking into account the determined class $k_\tau^*$ of the object 150.

With respect to determining the length and/or width of an object 150 while taking into account a class $k_\tau^*$ of the object 150, a priori probabilities p(k) for relatively small and/or slow classes (particularly for "pedestrians" and/or "bicyclists") may be strengthened, if necessary, to classify the object 150, in order to cause the probability of assigning a class for a relatively small object 150 to be increased (provided that it is not then precluded by a larger measured object size or maximum allowable speed). As a result, a particularly robust and/or conservative determination of length and/or width may be achieved. In particular, this adjustment or conservative estimation may be done to conservatively estimate the relevant range of a predicted object for an association in such cases.

Figure 7B:
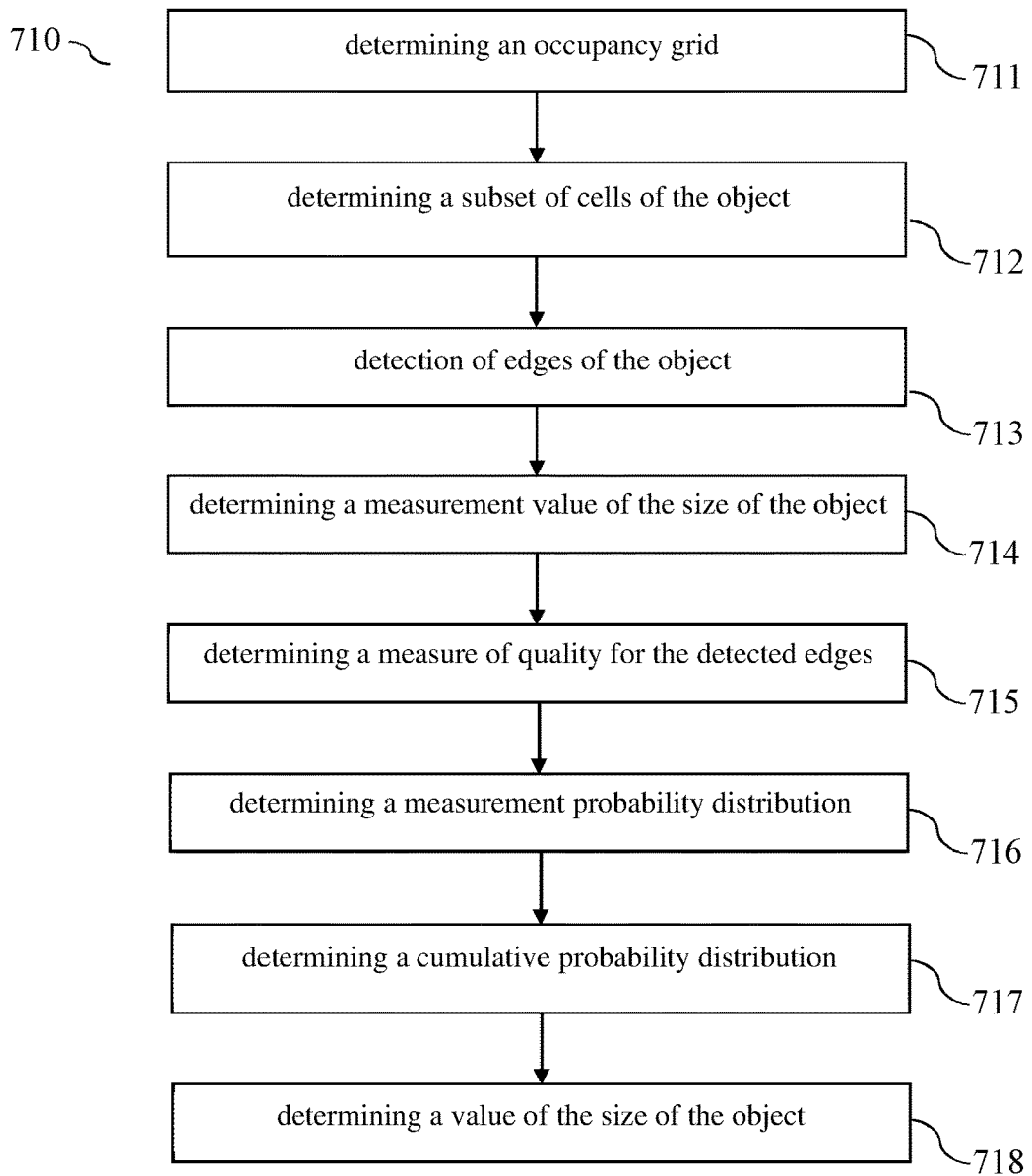
FIG. 7b shows a flow chart of an exemplary method for determining the size of an object.

FIG. 7b shows a flowchart of an exemplary method 710 for determining a value of a quantity (in particular, the length and/or width) of an object 150 in a spatial area. The method 700 may be carried out by an evaluation unit 101 of a vehicle 100. The spatial area may be an environment of the vehicle 100. The spatial area may include a plurality of cells 201.

The method 710 comprises, in an iterative manner for one time instant t at a time from the sequence of time instants, determining 711, based on sensor data from one or more sensors 111 with respect to the spatial area, a (actual) occupancy grid 200. The occupancy grid 200 may be determined as described herein. The occupancy grid 200 may indicate, for each of the plurality of cells 201, an evidence or evidence mass or probability that the respective cell 201 is vacant or occupied by the object 150 at the time t. The occupancy grid 200 may be iteratively updated for the sequence of points in time, each based on a current measurement of the sensor data.

Further, the method 710 comprises determining 712, based on the occupancy grid 200, a subset of one or more cells 201 from the plurality of cells 201 belonging to the object 150 at the time t. This may be done, for example (as described in connection with FIG. 5), using a clustering algorithm.

Further, the method 710 may comprise detecting 713, based on the occupancy grid 200, two opposing bounding edges of the object 150 (in particular, a boundary or bounding box 511, 512 of the object 150). In particular, the leading and trailing edges may be detected (to determine the length of the object 150) or the left and right edges may be detected (to determine the width of the object 150). The edges may be determined based on the arrangement of the subset of cells 201 of the object 150 (e.g., such that the boundary or bounding box 511, 512 is as small as possible while enclosing the subset of cells 201 as completely as possible).

Further, the method 710 may include determining 714 a measurement value of the size of the object 150 for the time t, based on a distance between the detected edges of the object 150.

Further, the method 710 includes determining 715, based on the occupancy grid 200, a measure of quality indicating how well the two opposing edges of the object 150 could be detected. In particular, the visibility of the edges may be determined (as described in this document).

Further, the method 710 may comprise determining 716, based on the measure of quality, a measurement probability distribution of the size of the object 150 for the time instant t. In this regard, the measurement probability distribution may indicate the probability of different values of the size of the object 150 around the measured value for the time instant t. The measurement probability distribution depends on the quality measure (especially for values of the size of the object 150 that are above the measurement value). In this case, the measurement probability distribution may increasingly become a uniform distribution as the measure of quality decreases (i.e., as the visibility of the edges decreases).

Further, the method 710 comprises determining 717 a cumulative probability distribution for the time t based on the measurement probability distribution for the time t and based on the cumulative probability distribution for a previous time t−1. In other words, the cumulative probability distribution may be updated using the measurement probability distribution for time t.

Finally, the method 710 includes determining 718 a value of the size of the object 150 for the time t based on the cumulative probability distribution for the time t. In particular, the size of the object 150 may be determined as the expected value or the mean value of the cumulative probability distribution for the time t.

Thus, the method 710 allows current measurement values related to the size of an object 150 to be iteratively combined with previous measurement values related to the size to successively increase the accuracy of the determined value of the size. This enables precise environment detection.

The present invention is not restricted to the illustrated embodiments. In particular, it should be noted that the description and figures are only intended to illustrate the principle of the proposed methods, devices and systems.

The invention claimed is:

1. A method for determining a representation of an object in a model of a vehicle's environment, the model comprising a spatial area, the spatial area comprising a plurality of cells, the method comprising, iteratively for one time point (t) at a time, from a sequence of time points:

determining, based on sensor data from one or more sensors with respect to the spatial area, an occupancy grid indicating, for each of the plurality of cells, evidence that the respective cell is vacant or occupied by the object at the point in time (t), determining, based on the occupancy grid, a subset of one or more cells from the plurality of cells belonging to the object at the point in time (t);

detecting, based on the occupancy grid, two opposing bounding edges of the object;

determining a measurement value of a size of the object for the point in time (t), based on a distance between the detected edges of the object;

determining, based on the occupancy grid, a measure of quality indicating how well the two opposing edges of the object could be detected;

determining, based on the measure of quality, a measurement probability distribution of the size of the object for the point in time (t), wherein the measurement probability distribution indicates a probability of different values of the size of the object around the measurement value for the point in time (t);

determining a cumulative probability distribution for the point in time (t) based on the measurement probability distribution for the point in time (t) and starting from the cumulative probability distribution for a previous point in time (t−1); and determining a value of the size of the object for the point in time (t) based on the cumulative probability distribution for the point in time (t), updating the model of the vehicle's environment with the representation of the object based on the value of the size of the object for the point in time (t).

2. The method according to claim 1, wherein:

a. the measurement probability distribution comprises, at least regionally, a normal distribution of values around the measurement value; and/or b. the measurement probability distribution is such that the measurement probability distribution for values greater than the measurement value increasingly approaches a uniform distribution as the measure of quality decreases; and/or c. the measurement probability distribution depends on the following function $$p(l \mid z_t^{l,\vartheta}) \propto \exp\left(-\frac{(l-l_z)^2}{2\varsigma_{l,\vartheta}\sigma_l^2}\right),$$

$$\varsigma_{l,\vartheta} = \begin{cases} (\vartheta_z^{front}\vartheta_z^{rear})^{-1}, & \text{if } l \geq l_z \\ 1, & \text{else} \end{cases},$$

d. l is a value of the size of the object;

e. $l_z$ is the measurement value;

f. $\sigma_l^2$ is a variance of the measurement value;

g. $\vartheta_z^{front}\vartheta_z^{rear}$ is the measure of quality for the quality of the detection of the edges; and h. $p(l \mid z_t^{l,\vartheta})$ is the measurement probability distribution for the point in time (t).

3. The method according to claim 1, wherein:

a. the cumulative probability distribution is described by a plurality of probability values for a corresponding plurality of size intervals; and/or b. the cumulative probability distribution for the point in time (t) is approximated by $$p(l_\tau \mid z_{1:t}^{l,\vartheta}) \approx \frac{p_{l_\tau,t}^i}{\delta^i}, l_\tau \in \left(l_i - \frac{\delta_i}{2}, l_i + \frac{\delta_i}{2}\right]$$

c. $p(l_\tau \mid z_{1:t}^{l,\vartheta})$ is the cumulative measurement probability distribution for the point in time (t);

d. $l_\tau$ is the value of the size of the object determined for the point in time (t);

e. $p_{l_\tau,t}^i$ is the probability value of the size of the object in the size interval i, with i=1, ..., $I_l$;
f. $\delta_i$ is an interval size of the size interval i; and
g. $l_i$ is a mean value of the size interval i.

4. The method according to claim 1, wherein:
a. the cumulative probability distribution is described by a plurality of probability values for a corresponding plurality of size intervals; and
b. the probability value for a size interval i for the point in time (t) is updated originating from the probability value for the size interval i for the previous point in time (t−1); and/or
c. the probability value for a size interval i is determined for the point in time (t), as $$p_{l_\tau,t}^i = \frac{p(l_i \mid z_t^{l,\vartheta}) p_{l_\tau,t-1}^i}{\sum_{j=1}^{I_l} p(l_j \mid z_t^{l,\vartheta}) p_{l_\tau,t-1}^j}$$

d. $p_{l_\tau,t}^i$ is the probability value of the size of the object in the size interval i for the point in time (t), with i=1, ..., $I_l$;
e. $p_{l_\tau,t-1}^i$ is the probability value of the size of the object in the size interval i for the previous point in time (t−1); and
f. $p(l_i|z_t^{l,\vartheta})$ is the measurement probability distribution for the point in time (t) for a mean value $l_i$ of the size interval i.

5. The method according to claim 1, wherein:
a. the object is described by a bounding box;
b. the bounding box has a length and a width;
c. the size of the object is a length and/or a width of the bounding box;
d. the two opposing bounding edges of the object are a leading edge and a trailing edge of the bounding box when the length of the bounding box is determined to be the size of the object; and/or
e. the two opposing bounding edges of the object are a right edge and a left edge of the bounding box when the width of the bounding box is determined to be the size of the object.

6. The method according to claim 1, the method comprising:
a. assigning the object to one class of a plurality of classes of road users;
b. determining a class probability distribution for the size of objects from the assigned class;
c. combining the class probability distribution with the cumulative probability distribution for the point in time (t) to determine a combined probability distribution for the point in time (t); and
d. determining the value of the size of the object for the point in time (t) based on the combined probability distribution for the point in time (t).

7. The method according to claim 6, wherein:
a. the cumulative probability distribution is described by a plurality of probability values $p_{l_\tau,t}^i$ for a corresponding plurality of size intervals i with i=1, ..., $I_l$;
b. $p(l_i|k_\tau^*)$ is a class probability for a mean value $l_i$ of the size interval i of the size of the object for the class $k_\tau^*$; and
c. the method comprises determining a plurality of combined probability values $p_{comb}^{i,l}$ for the corresponding plurality of size intervals i based on the respective product $p(l_i|k_\tau^*) p_{l_\tau,t}^i$.

8. The method according to claim 7, wherein determining the value of the size of the object comprises selecting a size interval from the plurality of size intervals based on the plurality of combined probability values $p_{comb}^{i,l}$.

9. The method according to claim 1, the method comprising:
a. determining a plurality of class probability distributions p(l|k) for the size of objects from a corresponding plurality of different classes k∈K;
b. determining a plurality of combined probability distributions for the point in time (t) for the plurality of different classes k∈K, based on the cumulative probability distribution for the point in time (t) and based on the plurality of class probability distributions p(l|k); and
c. assigning the object to a class $k_\tau^*$ from the plurality of different classes k∈K based on the plurality of combined probability distributions for the point in time (t).

10. The method according to claim 9, the method comprising:
a. determining a plurality of a priori probabilities p(k) for the plurality of different classes k∈K; and
b. determining the plurality of combined probability distributions for the time instant (t) based on the plurality of a priori probabilities p(k).

11. The method according to claim 9, the method comprising:
a. determining, based on the occupancy grid and/or based on the sensor data, a velocity of the object; and
b. assigning the object to a class $k_\tau^*$ from the plurality of different classes k∈K based on the determined speed of the object.

12. The method according to claim 9, the method comprising:
a. determining a plurality of expected values for the plurality of combined probability distributions for the point in time (t); and
b. assigning the object to a class $k_\tau^*$ from the plurality of different classes k∈K based on the plurality of expected values.

13. The method according to claim 12, wherein:
a. the cumulative probability distribution is described by a plurality of probability values $p^i/T_t$ for a corresponding plurality of size intervals i with i=1, ..., $l_i$;
b. $p(l_i|k)$ is the class probability of the class k for a mean value $l_i$ of the size interval i of the size of the object; and
c. the expected value $E_L[p(LT\tau|k)]$ for class k is calculated as $$E_L[p(L_\tau|k)] = \sum_{i=1}^{I_l} p(l_i|k) p_{l_\tau,t}^i.$$

14. The method according to claim 1, wherein:
a. the method comprises providing a driving function of a vehicle depending on the updated model of the vehicle's environment; and
b. the driving function comprises at least partially automated longitudinal and/or lateral guidance of the vehicle.

15. The method according to claim 1, wherein:
the one or more sensors comprise a radar sensor and/or a lidar sensor.

16. A processing unit for a vehicle, wherein the processing unit is configured to execute the method according to claim 1.

17. A vehicle comprising a processor, the processor configured to determine a value of a size of an object in a spatial area in an environment of the vehicle, the spatial area comprising a plurality of cells, the method comprising, iteratively for one time point (t) at a time, from a sequence of time points:
- determining, based on sensor data from one or more sensors with respect to the spatial area, an occupancy grid indicating, for each of the plurality of cells, evidence that the respective cell is vacant or occupied by the object at the point in time (t),
  the one or more sensors comprise a radar sensor and/or a lidar sensor;
- determining, based on the occupancy grid, a subset of one or more cells from the plurality of cells belonging to the object at the point in time (t);
- detecting, based on the occupancy grid, two opposing bounding edges of the object;
- determining a measurement value of the size of the object for the point in time (t), based on a distance between the detected edges of the object;
- determining, based on the occupancy grid, a measure of quality indicating how well the two opposing edges of the object could be detected;
- determining, based on the measure of quality, a measurement probability distribution of the size of the object for the point in time (t), wherein the measurement probability distribution indicates a probability of different values of the size of the object around the measurement value for the point in time (t);
- determining a cumulative probability distribution for the point in time (t) based on the measurement probability distribution for the point in time (t) and starting from the cumulative probability distribution for a previous point in time (t−1);
- determining a value of the size of the object for the point in time (t) based on the cumulative probability distribution for the point in time (t); and
- guiding the vehicle based on the determined value of the size of the object.

* * * * *